(12) United States Patent
Cherkasova

(10) Patent No.: US 7,454,424 B2
(45) Date of Patent: Nov. 18, 2008

(54) SYSTEM AND METHOD FOR EFFICIENTLY REPLICATING A FILE

(75) Inventor: Ludmila Cherkasova, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1061 days.

(21) Appl. No.: 10/345,719

(22) Filed: Jan. 16, 2003

(65) Prior Publication Data

US 2004/0143595 A1 Jul. 22, 2004

(51) Int. Cl.
*G06F 7/00* (2006.01)
*G06F 17/30* (2006.01)
*G06F 12/00* (2006.01)
*G06F 15/173* (2006.01)

(52) U.S. Cl. .................. 707/10; 707/204; 709/226

(58) Field of Classification Search ................. 707/10, 707/101, 104.1, 204; 709/222, 226, 235, 709/219, 236; 711/173
See application file for complete search history.

(56) References Cited

U.S. PATENT DOCUMENTS

| | | | | |
|---|---|---|---|---|
| 5,832,522 A * | 11/1998 | Blickenstaff et al. | ........ | 707/204 |
| 5,835,757 A * | 11/1998 | Oulid-Aissa et al. | .......... | 707/10 |
| 5,963,944 A | 10/1999 | Adams | | |
| 6,205,445 B1 | 3/2001 | Tokuyama | | |
| 6,230,251 B1 | 5/2001 | Batten et al. | | |
| 6,233,252 B1 | 5/2001 | Barker et al. | | |
| 6,269,080 B1 | 7/2001 | Kumar | | |
| 6,397,251 B1 | 5/2002 | Graf | | |
| 6,405,219 B2 | 6/2002 | Saether et al. | | |
| 6,449,688 B1 | 9/2002 | Peters et al. | | |
| 6,477,583 B1 | 11/2002 | Zayas et al. | | |
| 6,493,877 B1 | 12/2002 | Yamazaki et al. | | |
| 6,772,337 B1 * | 8/2004 | Yener | .......................... | 713/165 |
| 6,857,012 B2 * | 2/2005 | Sim et al. | ................... | 709/222 |
| 6,865,601 B1 * | 3/2005 | Cherkasova et al. | ......... | 709/220 |
| 6,925,499 B1 * | 8/2005 | Chen et al. | .................. | 709/226 |
| 6,970,939 B2 * | 11/2005 | Sim | .......................... | 709/236 |
| 7,080,400 B1 * | 7/2006 | Navar | ......................... | 725/139 |
| 2002/0083118 A1 | 6/2002 | Sim | | |
| 2002/0083187 A1 | 6/2002 | Sim et al. | | |
| 2004/0088380 A1 * | 5/2004 | Chung et al. | ................ | 709/219 |

OTHER PUBLICATIONS

Peter Scheuermann, Gerhard Weikum, Peter Zabback (1998), Data partitioning and load balancing in parallel disk systems, pp. 48-66.*

(Continued)

*Primary Examiner*—Don Wong
*Assistant Examiner*—Merilyn P Nguyen

(57) ABSTRACT

A method of distributing a file from a first node to a plurality of recipient nodes comprises logically organizing a plurality of recipient nodes to which a file is to be distributed into a plurality of groups of recipient nodes. The file is partitioned into a plurality of subfiles. The file is distributed to a plurality of recipient nodes using a distribution technique comprising (a) an origin node attempting to communicate the plurality of subfiles to recipient nodes of the first group, (b) the plurality of recipient nodes of the first group attempting to exchange their respective subfiles received from the origin node, and (c) attempting to distribute the plurality of subfiles from at least one node of the first group to recipient nodes of a second group. The method further comprises detecting a failed node, and the distribution technique adapting to distribute the file to each non-failed node.

34 Claims, 9 Drawing Sheets

OTHER PUBLICATIONS

Byers, J. et al., "Informed Content Delivery Across Adaptive Overlay Networks," Proc. of ACM SIGCOMM, 2002, pp. 1-14.
U.S. Appl. No. 10/345,716, Cherkasova.
U.S. Appl. No. 10/345,587, Cherkasova.
U.S. Appl. No. 10/345,718, Cherkasova.

* cited by examiner

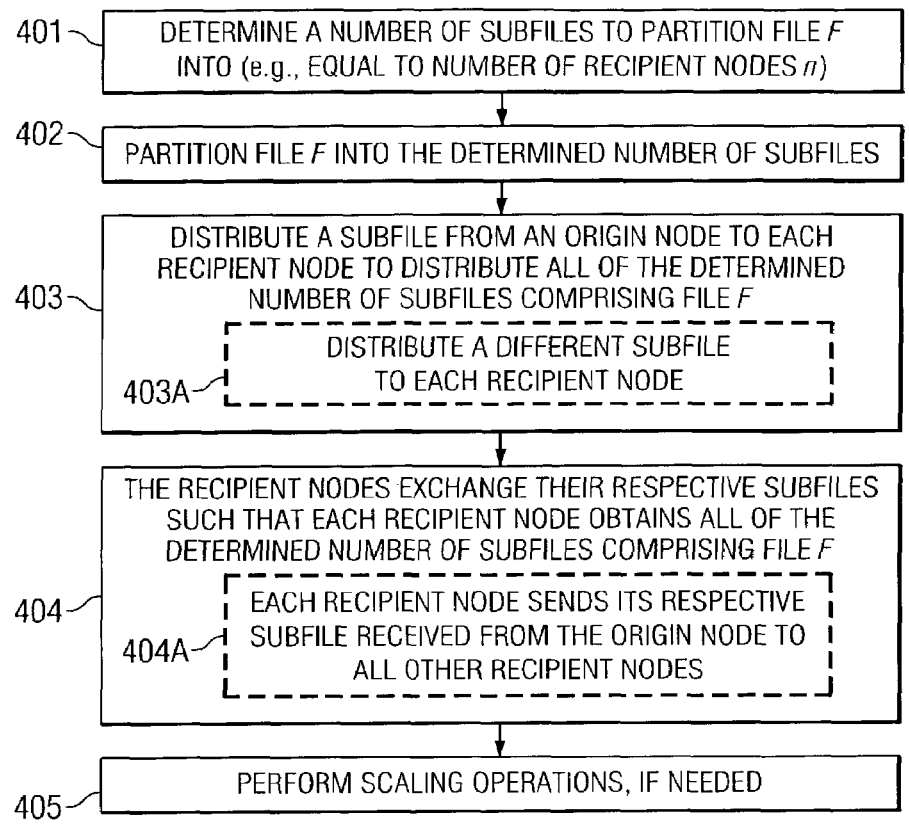
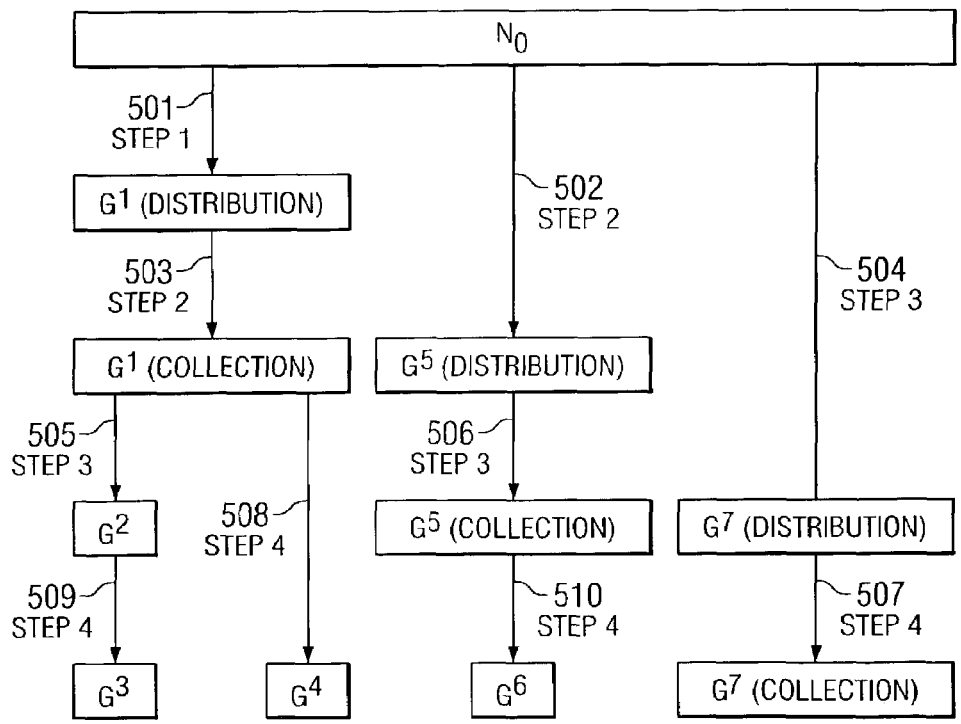

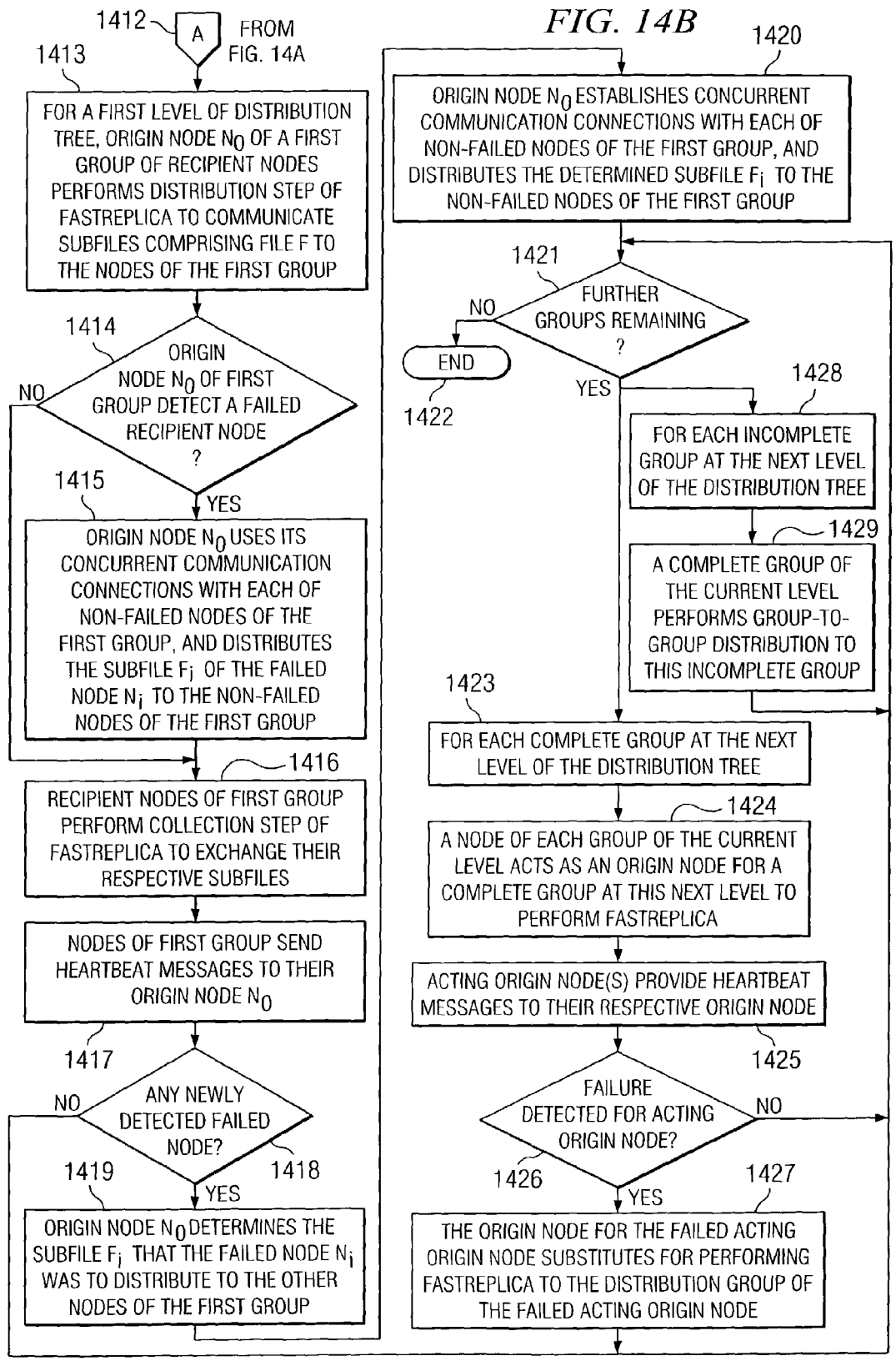

SYSTEM AND METHOD FOR EFFICIENTLY REPLICATING A FILE

CROSS-REFERENCE TO RELATED APPLICATIONS

This application is related to U.S. Published Patent Application No. 2004/143 575. filed Jan. 16, 2003 titled "SYSTEM AND METHOD FOR EFFICIENTLY REPLICATING A FILE", U.S. Published Patent Application No. 2004/0143647, filed Jan. 16, 2003 titled "SYSTEM AND METHOD FOR EFFICIENTLY REPLICATING A FILE AMONG A PLURALITY OF RECIPIENTS IN A RELIABLE MANNER", and U.S. Published Patent Application No. 2004/0143576, filed Jan. 16, 2003 titled "SYSTEM AND METHOD FOR EFFICIENTLY REPLICATING A FILE", the disclosures of which are hereby incorporated herein by reference.

FIELD OF THE INVENTION

The present invention relates in general to file distribution, and more specifically to systems and methods for efficiently distributing a file from a first node to a plurality of recipient nodes in a scalable and reliable manner that accounts for node failures.

DESCRIPTION OF RELATED ART

Today, much information is stored as digital data. Such information is often available to processor-based devices via client-server networks. Client-server networks are delivering a large array of information (including content and services) such as news, entertainment, personal shopping, airline reservations, rental car reservations, hotel reservations, on-line auctions, on-line banking, stock market trading, as well as many other services and types of content. Such information providers (sometimes referred to as "content providers") are making an ever-increasing amount of information available to users via client-server networks.

It is often desirable to communicate information to a plurality of different recipients. More particularly, it is often desirable to replicate a large file among a number of distributed computers. For instance, in some situations it is desirable for a plurality of distributed clients to receive a replicated file. For example, suppose a number of client computers comprise a software application program, and the application program's provider makes a modification or update to the program. The application provider may desire to distribute the software update to each of the client computers. As another example, a company may receive a new software program and desire to distribute the software program to all of its computers that are communicatively coupled to the company's Local Area Network (LAN) or Intranet.

As still another example, it may be desirable for a large file to be replicated among a plurality of distributed servers. For instance, as described further below, a plurality of distributed servers may be established for efficiently serving content to clients (e.g., each server may be responsible for a particular geographical region of clients), and it may be desirable to replicate a file from an originating server to the other distributed servers such that all of the servers provide the same content to their respective clients. For example, Content Delivery Networks (CDNs) are based on a large-scale distributed network of servers located closer to the edges of the Internet for efficient delivery of digital content, including various forms of multimedia content. The main goal of the CDN's architecture is to minimize the network impact in the critical path of content delivery as well as to overcome a server overload problem, which is a serious threat for busy sites serving popular content. CDNs implementing distributed content servers are becoming increasingly popular on the Internet, and particularly within the World Wide Web (the "web") portion of the Internet, for example, for serving content (web documents) to clients. Many edge servers may be implemented within the Internet (e.g., hundreds, thousands, or even hundreds of thousands of edge servers may be implemented) that are each to serve the same, replicated content to their respective clients.

For many web documents (e.g., html pages and images having a relatively small file size) served via CDN, active replication of the original content at the edge servers may not be needed. The CDN's edge servers act as caching servers, and if the requested content is not yet in the cache at the time it is requested by a client, the content is retrieved from the original server using the so-called pull model. The performance penalty associated with the initial document retrieval from the original server to the edge server serving the requesting client, such as higher latency observed by the client and the additional load experienced by the original server, is generally not significant for small to medium size web documents.

For large files (e.g., large documents, software download packages, and media files), a different operational mode is typically preferred. In this case, it is typically desirable to replicate these files at edge servers in advance of a client requesting them, using the so-called push model. For large files, actively replicating the files to a plurality of distributed edge servers is a challenging, resource-intensive problem, e.g., media files can require significant bandwidth and download time due to their large sizes: a 20 minute media file encoded at 1 Mbit/s results in a file of 150 Mbytes. If such a large file was not actively replicated to the edge servers in advance of a client requesting the file, a significant performance penalty may be incurred for retrieving the file from the original server, such as higher latency observed by the client and the additional load experienced by the original server in providing the large file to the edge server serving the requesting client. Sites supported for efficiency reasons by multiple mirror servers face a similar problem: the original content needs to be replicated across the multiple, geographically distributed, mirror servers.

BRIEF SUMMARY OF THE INVENTION

In accordance with one embodiment of the present invention, a method of distributing a file F from a first node to a plurality of recipient nodes is provided. The method comprises logically organizing a plurality of recipient nodes to which a file F is to be distributed into a plurality of groups of recipient nodes, wherein each group comprises a plurality of the recipient nodes. The method further comprises partitioning the file F into a plurality of sub files. The method further comprises performing distribution of the file F to a plurality of recipient nodes using a distribution technique that comprises (a) an origin node attempting to establish concurrent communication connections with the recipient nodes of a first group and communicate the plurality of subfiles to the recipient nodes of the first group, wherein the origin node attempts to communicate at least one subfile to each recipient node of the first group but not all of the plurality of subfiles to any recipient node of the first group, (b) the plurality of recipient nodes of the first group attempting to exchange their respective subfiles received from the origin node, and (c) attempting to distribute the plurality of sub files from at least one node of the first group to recipient nodes of a second group. The method further comprises detecting a failed node, and the distribution technique adapting to distribute the file F to each non-failed node of the plurality of recipient nodes to which the file F is to be distributed.

In accordance with another embodiment, a system comprises a means for logically organizing a plurality of recipient nodes to which a file F is to be distributed into a plurality of groups of recipient nodes, wherein each group comprises a plurality of the recipient nodes. The system further comprises a means for partitioning the file F into a plurality of subfiles. The system also comprises means for performing distribution of the file F to a plurality of recipient nodes using a distribution technique that comprises (a) an origin node attempting to establish concurrent communication connections with the recipient nodes of a first group and communicate the plurality of subfiles to the recipient nodes of the first group, wherein the origin node attempts to communicate at least one subfile to each recipient node of said first group but not all of the plurality of subfiles to any recipient node of the first group, (b) the plurality of recipient nodes of the first group attempting to exchange their respective subfiles received from the origin node, and (c) attempting to distribute the plurality of subfiles from at least one node of the first group to recipient nodes of a second group. The system also comprises a means for detecting a failed node, and the distribution technique adapts, responsive to the detecting means detecting a failed node, to distribute the file F to each non-failed node of the plurality of recipient nodes to which the file F is to be distributed.

In accordance with another embodiment, a system comprises an origin node that comprises a file F, and a plurality of recipient nodes to which the file F is to be distributed. The origin node is operable to logically organize the plurality of recipient nodes into a plurality of groups of recipient nodes, wherein each group comprises a plurality of the recipient nodes. The origin node is also operable to partition the file F into a plurality of subfiles. The origin node is further operable to attempt to establish concurrent communication connections with the recipient nodes of a first group and communicate the plurality of subfiles to the recipient nodes of the first group, wherein the origin node attempts to communicate at least one subfile to each recipient node of the first group but not all of the plurality of subfiles to any recipient node of the first group. The plurality of recipient nodes of the first group are operable to attempt to exchange their respective subfiles received from the origin node, and at least one node of the first group is operable to act as an origin node to attempt to distribute the plurality of subfiles to recipient nodes of a second group. The origin node is operable to detect a failed node in the first group, and the origin node is operable to manage distribution of the file F upon detecting a failed node in the first group in a manner such that every non-failed node of the first group receives the file F.

In accordance with another embodiment, a method of distributing a file F from a first node to a plurality of recipient nodes is provided. The method comprises logically organizing a plurality of recipient nodes to which a file F is to be distributed into a plurality of groups of recipient nodes, wherein each group comprises a plurality of the recipient nodes. The method further comprises partitioning the file F into a plurality of subfiles. The method also comprises an origin node attempting to establish concurrent communication connections with the recipient nodes of a first group and communicate the plurality of subfiles to the recipient nodes of the first group, wherein the origin node attempts to communicate at least one subfile to each recipient node of the first group but not all of the plurality of subfiles to any recipient node of the first group, and wherein if the origin node detects a failed node in the first group such that it is unable to communicate a particular subfile to such failed node, then the origin node using the established concurrent communication connections with non-failed nodes of the first group to communicate the particular subfile to the non-failed nodes. The method further comprises the plurality of recipient nodes of the first group attempting to exchange their respective subfiles received from the origin node, wherein if a node in the first group is detected as failed before communicating its respective subfile received from the origin node to all of the other nodes of the first group, then the origin node establishing concurrent communication connections with the non-failed nodes of the first group and communicating the respective subfile of the failed node to each of the non-failed nodes of the first group. The method further comprises attempting to distribute the plurality of subfiles from at least one node of the first group to recipient nodes of a second group, wherein if the origin node detects the at least one node as failed when attempting to distribute the plurality of subfiles to the recipient nodes of the second group, then the origin node establishing concurrent communication connections with the nodes of the second group and communicating the plurality of subfiles to each of the nodes of the second group.

BRIEF DESCRIPTION OF THE DRAWINGS

FIG. 4 shows an example operational flow diagram for distributing a file from an origin node to a plurality of recipient nodes in accordance with an embodiment of the present invention;

FIG. 5 shows a first example scaling technique for a file distribution process of an embodiment of the present invention;

FIGS. 14A-14B show an example operational flow diagram for a scaled distribution process of FIG. 9 having improved reliability to account for failed nodes in accordance with an embodiment of the present invention.

DETAILED DESCRIPTION

Figure 1:
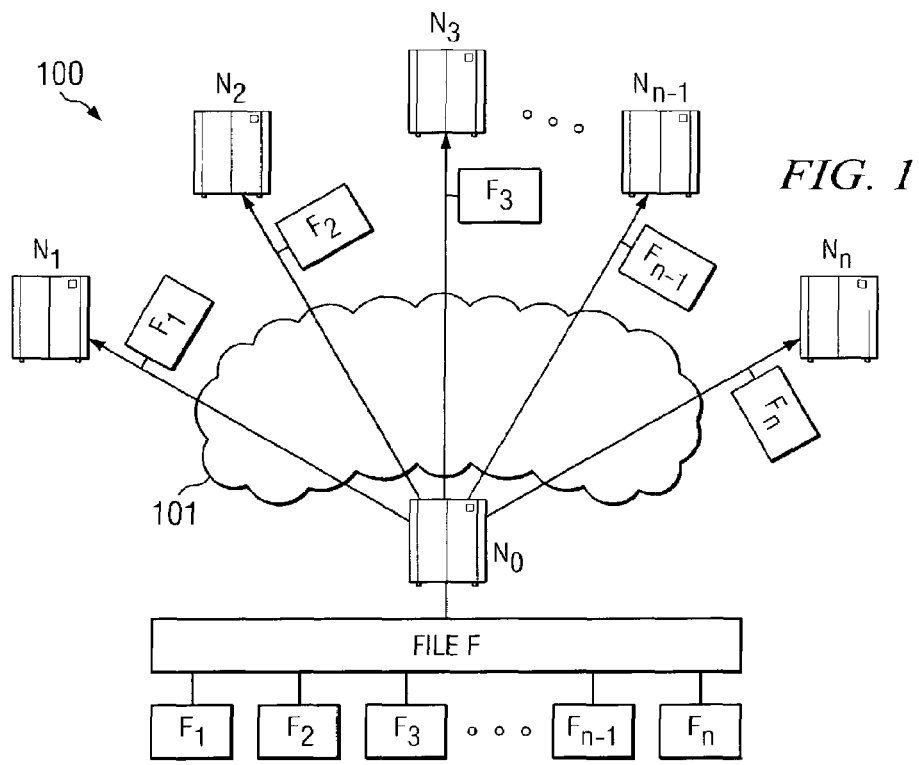
FIG. 1 shows an example environment in which embodiments of the present invention may be utilized and illustrates an example of distributing subfiles from an origin node to a plurality of recipient nodes in accordance with a file distribution technique of an embodiment of the present invention.

Various embodiments of the present invention are now described with reference to the above figures, wherein like reference numerals represent like parts throughout the several views. As described further below, embodiments of the present invention provide a system and method for distributing a file from a first node (which may be referred to herein as the "origin" node) to a plurality of recipient nodes. In certain embodiments, the plurality of recipient nodes comprise servers, such as edge servers in a CDN or mirror servers as examples. Of course, embodiments of the present invention may also be utilized for distributing a file to client nodes.

According to an embodiment of the present invention, a file distribution technique is provided that is scalable for application in distributing a file to a very large number of recipient nodes. For instance, embodiments of the present invention enable the recipient nodes to be logically organized into a plurality of different groups, with each group having a plurality of recipient nodes, and a file is efficiently distributed to the plurality of groups of recipient nodes.

According to one embodiment, the file to be distributed is partitioned into a plurality of parts (or "subfiles"), and the plurality of parts are distributed from the origin node to a first group of recipient nodes. More particularly, all of the subfiles comprising the file to be distributed are communicated from the origin node to the recipient nodes of the first group, but the origin node does not send all of the subfiles to each recipient node of the first group. That is, the origin node sends only a portion of the subfiles that comprise the file to be distributed to each recipient node of the first group. For instance, in one embodiment, each recipient node of the first group receives a different one of the subfiles of the file to be distributed. Thereafter, the recipient nodes of the first group exchange their respective subfiles with each other, thus resulting in each recipient node of the first group obtaining the full file. Accordingly, the origin node is not required to communicate the full file to each recipient node of the first group, but rather may communicate only a portion thereof to each recipient node of the first group, and those recipient nodes then exchange their respective portions to result in each recipient node of the first group obtaining all subfiles comprising the full file.

Various techniques may be implemented for distributing a file from an origin node to a first group of recipient nodes in the manner described above. One embodiment of the present invention implements a technique referred to herein as the FastReplica distribution technique. With FastReplica, to replicate a large file among a group of n recipient nodes, the original file F is partitioned into n subfiles of approximately equal size and each subfile is transferred from the origin node to a different node in the recipient group. That is, the subfiles are communicated to the recipient nodes from the origin node concurrently. Such transfer of the subfiles from the origin node to the recipient nodes is referred to herein as a "distribution" step. Thereafter, each recipient node propagates its respective subfile (i.e., the subfile that it received from the origin node) to the remaining recipient nodes in the group. That is, each recipient node concurrently communicates its subfile to the other nodes of the group. This exchange of subfiles by recipient nodes is referred to herein as a "collection" step, as the recipient nodes each collect the subfiles comprising file F from the other recipient nodes. Thus, instead of typical replication of the entire file to n nodes by using n communication paths (e.g., Internet paths) connecting the origin node to the replication group, this FastReplica technique exploits n×n communication paths within the replication group where each path is used for transferring the $$\frac{1}{n} - th$$

portion of the file.

As mentioned above, embodiments of the present invention are scalable and enable distribution of a file to a plurality of groups of recipient nodes. Various distribution techniques may be utilized to enable the distribution of a file to a plurality of different groups of recipient nodes. In one implementation, an origin node distributes the subfiles comprising file F to a first group of recipient nodes, such as in the above-described distribution step of the FastReplica distribution technique. Thereafter, the recipient nodes of the first group exchange their respective subfiles, such as in the above-described collection step of the FastReplica distribution technique. While the first group performs this collection step, the origin node may perform a distribution of the subfiles comprising file F to a second group of recipient nodes. Thereafter, the recipient nodes of the second group exchange their respective subfiles, such as in the above-described collection step of the FastReplica distribution technique. While the second group performs this collection step, the origin node may perform a further distribution of the subfiles comprising file F to a third group of recipient nodes. Further, once the first group has performed the collection step, each of those nodes may establish a communication connection to each of the nodes of a fourth group of recipient nodes, and each node of the first group may communicate the subfile that it received from the origin node to each node of the fourth group. Thus, at the end of this distribution from the first group to the fourth group, each node of the fourth group has all of the subfiles comprising file F, and therefore do not need to perform a collection step within such fourth group. Such a distribution from the first group to the fourth group is referred to herein as a "group-to-group" distribution.

In another scaled distribution implementation, an origin node distributes the subfiles comprising file F to a first group of recipient nodes, such as in the above-described distribution step of the FastReplica distribution technique. Thereafter, the recipient nodes of the first group exchange their respective subfiles, such as in the above-described collection step of the FastReplica distribution technique. Thereafter, the recipient nodes of the first group may each act as an origin node to distribute file F to further groups of recipient nodes in a manner such as that used to distribute the file F to this first group, e.g., each node of the first group may use the FastReplica distribution technique to distribute file F to further groups of recipient nodes. In this manner, the FastReplica distribution technique may be performed iteratively wherein after a group of nodes receives file F through the FastReplica distribution technique, each of such nodes may act as an origin node to distribute file F to further groups of nodes using the FastReplica distribution technique. Thus, in this example implementation, each node that is used for distribution of file F to further recipient nodes distributes the file F to a plurality of recipient nodes (e.g., to another group having a plurality of recipient nodes), and therefore such distribution technique may be referred to herein as a "one-to-many" distribution.

As described further below, in certain distribution environments the second scaled distribution technique identified above results in a wider, shorter distribution tree than the first scaled distribution technique identified above. Accordingly, in those environments, the second scaled distribution technique provides improved efficiency in distributing file F. In certain implementations described herein, a hybrid of the above-identified scaled distribution techniques may be used. For instance, "one-to-many" distributions may be performed for certain group(s) of recipient nodes, and "group-to-group" distribution may be performed for other group(s) of recipient nodes.

Embodiments of the present invention improve the robustness (or "reliability") of the above file distribution process to deal with node failures. As can be seen from the above description of FastReplica, for example, such FastReplica algorithm is sensitive to node failures. For example, if a node of a group fails during the collection step for the group, this event may impact all other nodes in such distribution group because each node depends on the other nodes of the group to receive the other nodes' respective subfiles. Further, in the second scaling technique identified above, a node may fail when it is acting as a recipient node in a distribution group, or the node may fail when it is acting as an origin node for distributing file F to further groups. Embodiments of the present invention enable reliable distribution of a file to recipient nodes even if node failures are encountered. More particularly, techniques for detecting a node failure and detouring the distribution of the subfiles around such failed node are provided in an embodiment of the present invention.

To better appreciate aspects of embodiments of the present invention, it is appropriate to briefly review the existing techniques in the art for file distribution. Currently, the three most popular methods used for content distribution (or file "replication") in the Internet environment are: (1) satellite distribution, (2) multicast distribution, and (3) application-level multicast distribution.

With satellite distribution, the content distribution server (or the "origin node") has a transmitting antenna. The servers (or "recipient nodes") to which the content should be replicated (or the corresponding Internet Data centers, where the servers are located) have a satellite receiving dish. The original content distribution server broadcasts a file via a satellite channel. Among the shortcomings of the satellite distribution method are that it requires special hardware deployment and the supporting infrastructure (or service) is quite expensive.

With multicast distribution, an application can send one copy of each packet of a file and address it to the group of recipient nodes (IP addresses) that want to receive it. This technique reduces network traffic by simultaneously delivering a single stream of information to hundreds/thousands of interested recipients. Multicast can be implemented at both the data-link layer and the network layer. Applications that take advantage of multicast technologies include video conferencing, corporate communications, distance learning, and distribution of software, stock quotes, and news. Among the shortcomings of the multicast distribution method is that it requires a multicast support in routers, which still is not consistently available across the Internet infrastructure.

Since the native IP multicast has not received widespread deployment, many industrial and research efforts have shifted to investigating and deploying the application level multicast, where nodes across the Internet act as intermediate routers to efficiently distribute content along a predefined mesh or tree. A growing number of researchers have advocated this alternative approach, where all multicast related functionality, including group management and packet replication, is implemented at end systems. In this architecture, nodes participating in the multicast group self-organize themselves into a scalable overlay structure using a distributed protocol. Further, the nodes attempt to optimize the efficiency of the overlay by adapting to changing network conditions and considering the application-level requirements.

An extension for the end-system multicast is introduced by J. Byers, J. Considine, and M. Mitzenmacher in "Informed Content Delivery Across Adaptive Overlay Networks", *Proc. Of ACM SIGCOMM*, 2002, in which instead of using the end systems as routers forwarding the packets, the authors propose that the end-systems actively collaborate in an informed manner to improve the performance of large file distribution. The main idea is to overcome the limitation of the traditional service models based on tree topologies where the transfer rate to the client is defined by the bandwidth of the bottleneck link of the communication path from the origin server. The authors propose to use additional cross-connections between the end-systems to exchange the complementary content these nodes have already received. Assuming that any given pair of end-systems has not received exactly the same content, these cross-connections between the end-systems can be used to "reconcile" the differences in received content in order to reduce the total transfer time.

As mentioned above, embodiments of the present invention may implement a distribution technique referred to herein as the FastReplica distribution technique. Example embodiments implementing such FastReplica technique are described further below. Consider the following notations:

(a) Let $N_0$ be a node (which may be referred to as an "origin node" or "origin server") which has an original file F, and let Size(F) denote the size of file F in bytes; and (b) Let $R=\{N_1, \ldots, N_n\}$ be a replication set of nodes (i.e., a set of recipient nodes to which the file F is to be distributed).

The problem becomes replicating file F across nodes $N_1, \ldots, N_n$, while minimizing the overall replication time. In one embodiment, a relatively small group of recipient nodes $N_1, \ldots, N_n$ exist (e.g., a sufficiently small number of recipient nodes such that each node $N_0, \ldots, N_n$ can support concurrent communication connections to all of the other n-1 nodes, which is typically 30 or less recipient nodes). The FastReplica technique may be implemented for application to a relatively small number n (e.g., approximately 30 or less) of recipient nodes, wherein such an implementation may be referred to herein as "FastReplica in the Small." In this FastReplica in the Small technique, file F is divided into n equal subsequent subfiles: $F_1, \ldots, F_n$, where $$Size(F_i) = \frac{Size(F)}{n} \text{ bytes}$$

for each i: $1 \leq i \leq n$.

The FastReplica in the Small algorithm then performs a distribution step in which origin node $N_0$ opens n concurrent network connections to nodes $N_1, \ldots, N_n$, and sends to each recipient node $N_i (1 \leq i \leq n)$ the following items:

(a) a distribution list of nodes $R=\{N_1, \ldots, N_n\}$ to which subfile $F_i$ is to be sent in the next step (each node $N_i$ is itself excluded from its distribution list); and (b) subfile $F_i$.

An example of this distribution step of the FastReplica algorithm is shown in FIG. 1. For instance, FIG. 1 shows an example environment 100 in which embodiments of the present invention may be utilized. Environment 100 comprises origin node $N_0$ and recipient nodes $N_1, N_2, N_3, \ldots, N_{n-1}, N_n$ that are communicatively coupled via communication network 101. Communication network 101 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computing devices to communicate with each other. In certain embodiments, nodes $N_0$-$N_n$ comprise server computers. For instance, nodes $N_1, \ldots, N_n$ may comprise edge servers in a CDN or mirror servers within a mirrored network. In other embodiments, nodes $N_0$-$N_n$ may comprise server and/or client computers. For example, node $N_0$ may comprise a server computer, and nodes $N_1, \ldots, N_n$ may comprise client computers to receive a file (e.g., software application file, etc.) from node $N_0$. Further, nodes $N_0, \ldots, N_n$ may each comprise any processor-based device now known or later discovered, including without limitation personal computers (PCs) or mainframe computers.

Origin node $N_0$ comprises file F stored thereto, and such file F is partitioned into n subfiles $F_1, F_2, F_3, \ldots, F_{n-1}, F_n$, wherein the sum of subfiles $F_1, F_2, F_3, \ldots, F_{n-1}, F_n$ comprise the total file F. As shown, the plurality of subfiles are distributed from origin node $N_0$ to the recipient nodes $N_1, \ldots, N_n$. More particularly, all of the n subfiles comprising file F are communicated from origin node $N_0$ to the recipient nodes $N_1, \ldots, N_n$, but origin node $N_0$ does not send all of the n subfiles to each recipient node. That is, origin node $N_0$ sends only a portion of the n subfiles to each recipient node. For instance, in this example, each recipient node receives a different one of the n subfiles from origin node $N_0$. More particularly, origin node $N_0$ communicates subfile $F_1$ to node $N_1$, subfile $F_2$ to node $N_2$, subfile $F_3$ to node $N_3, \ldots$, subfile $F_{n-1}$ to node $N_{n-1}$, and subfile $F_n$ to node $N_n$ via communication network 101. Additionally, in an embodiment of the present invention, origin node $N_0$ also sends a distribution list to each recipient node $N_1, \ldots, N_n$. The distribution list for each node identifies the other recipient nodes that such recipient node is to communicate the subfile that it received from origin node $N_0$. For example, origin node $N_0$ may send to node $N_1$ a distribution list identifying nodes $N_2, \ldots, N_n$. Similarly, origin node $N_0$ may send to node $N_2$ a distribution list identifying nodes $N_1$, and $N_3, \ldots, N_n$, and so on.

Figure 2:
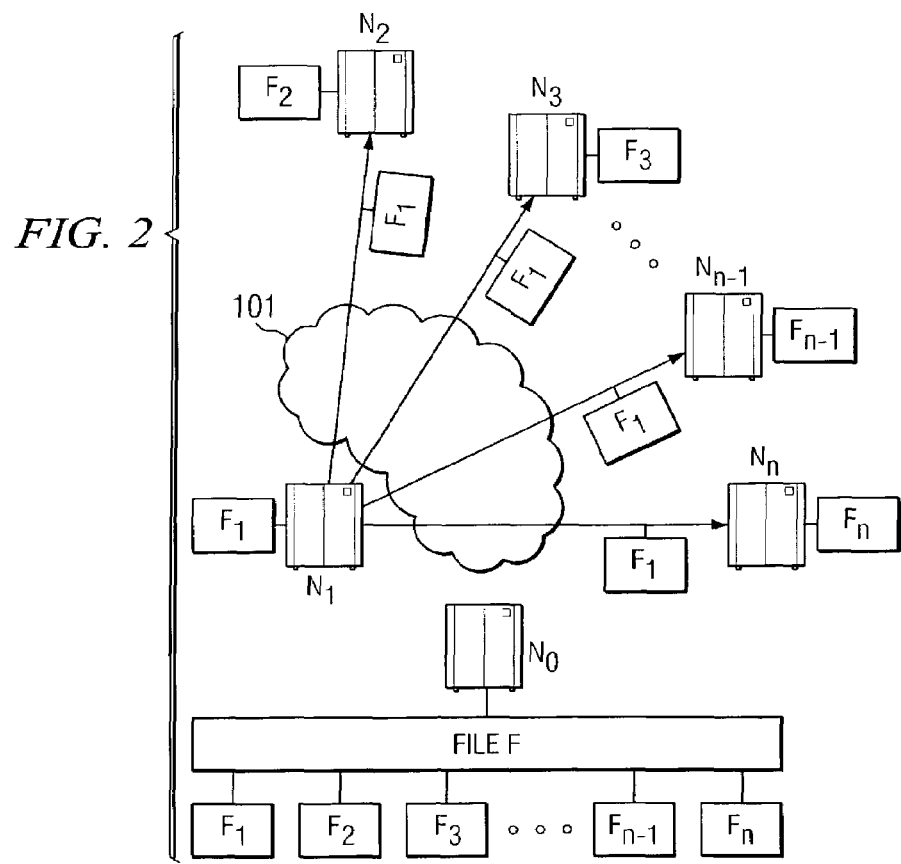
FIG. 2 shows an example of a recipient node communicating the subfile that it received from an origin node to other recipient nodes in accordance with the file distribution technique of FIG. 1.

The next step of the FastReplica algorithm is referred to herein as the collection step. An example of the collection step is described herein in conjunction with FIGS. 2 and 3. After receiving file $F_i$, node $N_i$ opens (n-1) concurrent network connections to remaining nodes in the recipient group and sends subfile $F_i$ to them, as shown in FIG. 2 for node $N_1$. More particularly, FIG. 2 shows that node $N_1$ opens n-1 concurrent network connections, i.e., one network connection with each of recipient nodes $N_2, \ldots, N_n$. Node $N_1$ communicates subfile $F_1$, which it received from origin node $N_0$ in the above-described distribution step, to each of the recipient nodes $N_2, \ldots, N_n$.

Figure 3:
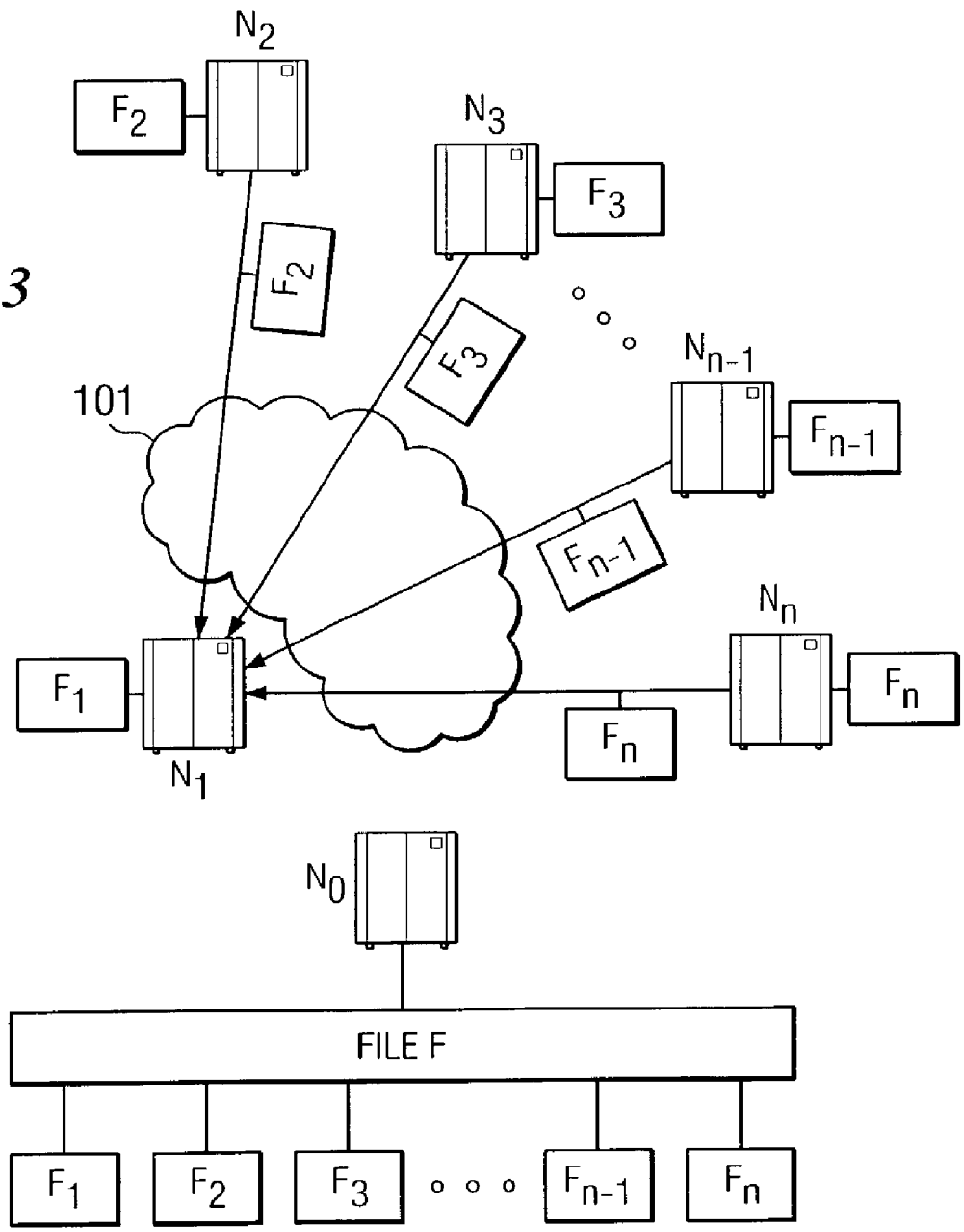
FIG. 3 shows an example of a recipient node receiving subfiles from each of the other recipient nodes in accordance with the file distribution technique of FIG. 1.

Similarly, FIG. 3 shows the set of incoming, concurrent connections to node $N_1$ from the remaining recipient nodes $N_2, \ldots, N_n$, transferring the complementary subfiles $F_2, \ldots, F_n$ during the collection step of the FastReplica algorithm. More particularly, FIG. 3 shows that node $N_1$ has n-1 concurrent network connections, i.e., one network connection with each of recipient nodes $N_2, \ldots, N_n$ through which node $N_1$ receives the other subfiles comprising file F from the recipient nodes $N_2, \ldots, N_n$. That is, each of recipient nodes $N_2, \ldots, N_n$ communicates its respective subfile that it received from origin node $N_0$ in the above-described distribution step to node $N_1$.

Thus at the end of this collection step, each node $N_i$ has the following set of network connections:

(a) there are n-1 outgoing connections from node $N_i$: one connection to each node $N_k$ ($k \neq i$) for sending the corresponding sub file $F_i$ to node $N_k$; and (b) there are n-1 incoming connections to node $N_i$: one connection from each node $N_k$ ($k \neq i$) for sending the corresponding subfile $F_k$ to node $N_i$.

Thus, at the end of this collection step, each recipient node receives all subfiles $F_1, \ldots, F_n$ comprising the entire original file F. Accordingly, each of the nodes in the replication set R obtain the full file F (which is reconstructed through the received subfiles).

In view of the above, it should be recognized that instead of the typical replication of an entire file to n nodes by using n communication paths connecting the origin node N0 to the replication group, the example FastReplica algorithm described above exploits n×n different communication paths within the replication group wherein each path is used for transferring $$\frac{1}{n}\text{-}th$$

of the file F. Thus, the impact of congestion on any particular communication path participating in the schema is limited for a transfer $$\frac{1}{n}\text{-}th$$

of the file F. Additionally, the example FastReplica algorithm described above takes advantage of both the upload and download bandwidth of the recipient nodes. Typical servers in CDN environments have symmetrical upload and download bandwidth to be able to utilize this feature. Such FastReplica algorithm and its efficiency for various types of bandwidths that may be available between the nodes is discussed further in U.S. Published Patent Application No. 2004/0143575, filed Jan. 16, 2003 titled "SYSTEM AND METHOD FOR EFFICIENTLY REPLICATING A FILE", the disclosure of which is hereby incorporated herein by reference.

FIG. 4 shows an example operational flow diagram for distributing a file from an origin node to a plurality of recipient nodes in accordance with an embodiment of the present invention. In operational block 401, a number of subfiles into which file F is to be partitioned is determined. For instance, as shown in the example of FIGS. 1-3 above, in certain embodiments a FastReplica technique may be implemented in which file F may be partitioned into a number of subfiles corresponding to the number of recipient nodes n of a group to which the file F is to be distributed (if the number n of recipient nodes is sufficiently small such that each node $N_0, \ldots, N_n$ can support concurrent communication connections to all of the other n-1 nodes). In other implementations, the file F may be partitioned into a number of subfiles corresponding to the number k of concurrent communication connections that can be supported by each of the nodes $N_0, \ldots, N_n$ (wherein if k is less than the total number of recipient nodes n, then the distribution technique may be scaled for distribution to a plurality of groups of recipient nodes as described further below). In operational block 402, file F is partitioned into the determined number of sub files.

In operational block 403, a subfile is distributed from an origin node to each recipient node, wherein all of the subfiles comprising file F are distributed to the recipient nodes. As shown, in certain embodiments block 403 may comprise operational block 403A, wherein a different subfile is distributed to each recipient node within the distribution group, as in the example of FIGS. 1-3 above in which the FastReplica technique is implemented. That is, each recipient node may receive a unique subfile from the origin node that is not received by any of the other recipient nodes within the distribution group.

In operational block 404, the recipient nodes exchange their respective subfiles such that each recipient node obtains all of the determined number of subfiles comprising file F. As shown, in certain embodiments block 404 may comprise operational block 404A wherein each recipient node sends its respective subfile received from the origin node to all other recipient nodes, as in the above-described FastReplica implementation.

In operational block 405, scaling operations may be performed, if needed. That is, if the number of recipient nodes is sufficiently large, the distribution process may be scaled to enable distribution to such a large number of recipient nodes. For instance, the distribution technique may be scaled to allow for a file distribution to hundreds, thousands, or tens of thousands, of recipient nodes, for example. More particularly, if it is determined that the number k of concurrent communication connections that can be supported by each of the nodes $N_0, \ldots, N_n$ is less than the total number of recipient nodes n, then the distribution technique may be scaled for distribution to a plurality of groups of recipient nodes as described further below. Various suitable scaling techniques may be utilized.

One scaling technique that may be implemented is described in U.S. Published Patent Application No. 2004/0143575, filed Jan. 16. 2003 titled "SYSTEM AND METHOD FOR EFFICIENTLY REPLICATING A FILE", the disclosure of which has been incorporated herein by reference. This first scaling technique that may be implemented is described herein below in conjunction with FIGS. 5-8.

According to this first scaling technique, the above-described FastReplica in the Small distribution strategy is generalized to a case in which a set of nodes to which file F is to be distributed is very large (e.g., hundreds, thousands, tens of thousands, or more of such recipient nodes). According to one example implementation of this scaling technique, let k be a number of network connections chosen for concurrent transfers between a single node and multiple recipient nodes (k limits the number of nodes in each distribution group for the above-described FastReplica strategy). An appropriate value of k can be experimentally determined for a given environment via probing, for example. Heterogeneous nodes might be capable of supporting a different number of connections, in which case the value of k may be a number of connections suitable for most of the nodes in the overall replication set.

File F is divided in k equal subsequent subfiles: $F_1, \ldots, F_k$, where $$\text{Size}(F_i) = \frac{\text{Size}(F)}{k} \text{ bytes}$$

for each $1 \leq i \leq k$. This example scaling technique is described in conjunction with FIG. 5 in which $G^1, G^2, \ldots, G^7$ are used to denote the replication groups of nodes, each group having k nodes. The boxes in the example of FIG. 5 reflect the node or group of nodes involved in the communications on a particular logical step of the algorithm. FIG. 5 provides an example in which 4 logical steps are performed in the scaled distribution process, but as will be recognized from the description of such scaled distribution process any other number of logical steps may be appropriate in other implementations (depending on the number of nodes to which the file F is being distributed).

First, in the example of FIG. 5, origin node $N_0$ opens k concurrent network connections to nodes $N_1^1, \ldots, N_k^1$ of group $G^1$, and sends subfile $F_i$ to the corresponding recipient node $N_i^1 (1 \leq i \leq k)$. This first step is represented by communication path(s) 501 to box $G^1$(distribution) in FIG. 5 and is similar to the distribution step of FastReplica in the Small described above.

In the second step of this example scaled distribution algorithm:

(a) In group $G^1$, each node $N_i^1$ sends its subfile $F_i$ to the rest of the nodes in group $G^1$. In this way, at the end of this step, each node in group $G^1$ has all subfiles $F_1, \ldots, F_k$ of original file F. This step is represented by communication path(s) 503 to box $G^1$ (collection) in FIG. 5 and is similar to the collection step of FastReplica in the Small described above. It should be noted that the activities performed in this second step are not synchronized between the different nodes of group $G^1$. Rather, Node $N^{i1}$ starts transferring its subfile F to the remaining nodes of group $G^1$ independently of the similar step performed by the other nodes. This distributed nature of the FastReplica algorithm makes it more efficient. Thus, during the same physical time, the nodes in the group can perform different logical steps of the algorithm. For example, while some of the nodes of $G^1$ might be still finishing step 2 of the algorithm, some of the "faster" nodes of $G^1$ might start transfers related to step 3 of the algorithm (described below).

(b) In the same logical step (step 2), originator node $N_0$ opens k concurrent network connections to nodes $N_1^5, \ldots, N_k^5$ of group $G^5$, and using these i connections, it sends subfile $F_i$ to the corresponding recipient node $N^{i5}$ in group $G^5$ $1 \leq i \leq k$. This step is represented by communication path(s) 502 to box $G^5$(distribution) in FIG. 5.

Figure 6:
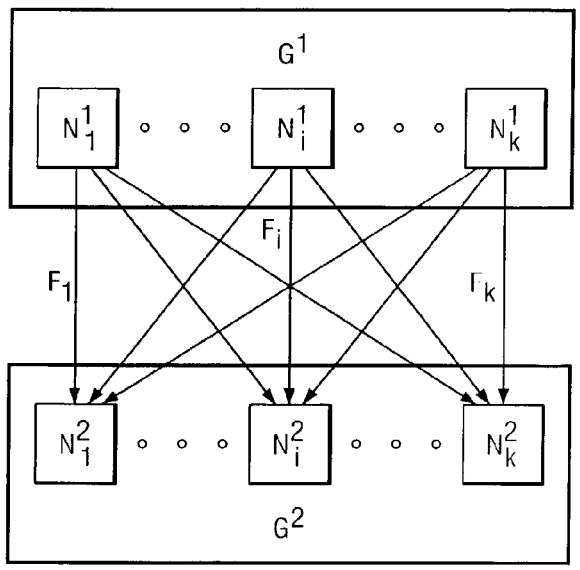
FIG. 6 shows communication paths between two groups of nodes in the first scaled distribution process of FIG. 5.
Figure 7:
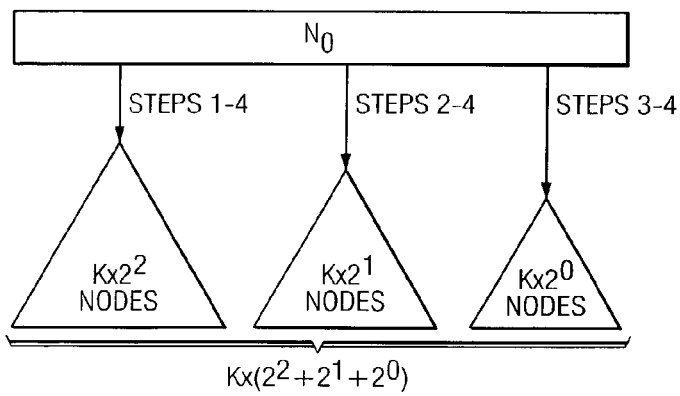
FIG. 7 shows a graphical representation of the number of recipient nodes to which a file F can be replicated in 4 logical steps in accordance with the first scalable file distribution process of FIG. 5.

The above communications at steps 1 and 2 are similar to the communications defined in the example FastReplica in the Small algorithm described above. In step 3 of this example scaled distribution algorithm, the communications between groups $G^1$ and $G^2$ follow a different file exchange protocol defining another typical communication pattern actively used in the general FastReplica algorithm. Step 3 of FIG. 5 may be referred to herein as a general step, and includes the following operations:

(a) Each node $N_i^1$ of group $G^1$ opens k concurrent network connections to all k nodes of group $G^2$ for transferring its subfile $F_i$. In this way, at the end of this step, each node of group $G^2$ has all subfiles $F_1, \ldots, F_k$ of original file F. This step is represented by communication path(s) 505 to box $G^2$ in FIG. 5. The communications between the nodes in groups $G^1$ and $G^2$ are shown in more detail in FIG. 6. Turning briefly to FIG. 6, it can be seen that node $N_1^1$ of group $G^1$ distributes the subfile that it originally received from origin node $N_0$ (i.e., subfile $F_1$) to each of nodes $N_1^2, \ldots, N_k^2$ of group $G^2$ via concurrent communication connections therewith. Similarly, node $N_i^1$ of group $G^1$ distributes the subfile that it originally received from origin node $N_0$ (i.e., subfile $F_i$) to each of nodes $N_1^2, \ldots, N_k^2$ of group $G^2$ via concurrent communication connections therewith. Likewise, node $N_k^1$ of group $G^1$ distributes the subfile that it originally received from origin node $N_0$ (i.e., subfile $F_k$) to each of nodes $N_1^2, \ldots, N_k^2$ of group $G^2$ via concurrent communication connections therewith. Because of the manner in which each node $N_i^1$ of group $G^1$ opens k concurrent network connections to all k nodes of group $G^2$ for transferring its subfile $F_i$, this scaled distribution technique may be referred to as a "group-to-group" distribution technique. That is, because the nodes of a first group each communicate the respective subfile that they received from origin node $N_0$ to each of the nodes of a second group, the file is distributed directly from the first group to the second group without requiring exchange of information between the nodes of the second group.

(b) Also in logical step 3 of FIG. 5, in group $G^5$, each node $N_i^5$ sends its subfile $F_i$ to the rest of the nodes in the group. In this way, at the end of this step, each node in group $G^5$ has all subfiles $F_1, \ldots, F_k$ of original file F. This step is represented by communication path(s) 506 to box $G^5$(collection) in FIG. 5.

(c) At the same logical step 3 of FIG. 5, origin node $N_0$ opens k concurrent network connections to nodes $N_1^7, \ldots, N_k^7$ of group $G^7$, and using i connection, it sends the subfile $F_i$ to the corresponding recipient node $N_i^7$ in group $G^7$ ($1 \leq i \leq k$). This step is represented by communication path(s) 504 to box $G^7$ (distribution) in FIG. 5.

Next, logical step 4 is performed in this scaled distribution example of FIG. 5. Step 4 comprises the following operations:

(a) In group $G^2$, each node $N_i^2$ sends its subfile $F_i$ to all k nodes in group $G^3$ (in a manner as described above with FIG. 6). Thus at the end of this step, each node in group $G^3$ has all subfiles $F_1, \ldots, F_k$ of original file F. This step is represented by communication path(s) 509 to box $G^3$ in FIG. 5.

(b) In group $G^1$, each node $N_i^2$ sends its subfile $F_i$ to all k nodes in group $G^4$ (in a manner as described above with FIG. 6). In this way, at the end of this step, each node in group $G^4$ has all subfiles $F_1, \ldots, F_k$ of original file F. This step is represented by communication path(s) 508 to box $G^4$ in FIG. 5.

(c) In group $G^5$, each node $N_i^1$ opens k concurrent network connections to all k nodes of group $G^6$ for transferring its subfile $F_i$ (in a manner as described above with FIG. 6). At the end of this step, each node in the group $G^6$ has all subfiles $F_1, \ldots, F_k$ of original file F. This step is represented by communication path(s) 510 to box $G^6$ in FIG. 5.

(d) In the same logical step 4, in the group $G^7$, each node $N^{j1}$ sends its subfile $F_i$ to the rest of the nodes in the group. In this way, at the end of this step, each node in group $G^6$ has all subfiles $F_1, \ldots, F_k$ of original file F. This step is represented by the communication path(s) 507 to box $G^7$(collection) in FIG. 5, and is analogous to the collection step described above with the FastReplica in the Small algorithm.

A relatively simple induction rule defines the number of nodes to which the original file F can be replicated in 4 logical steps (such as the 4 logical steps of FIG. 5) in this first scalable distribution algorithm: $k \times (2^2+2^1+2^0)$, which is graphically shown in FIG. 7.

The example considered above with FIG. 5 can be generalized to the arbitrary number of algorithm steps i, where $i \leq 2$. The number of nodes to which original file F can be replicated in i algorithm steps is defined by the following formula:

$$k \times \sum_{j=2}^{i} 2^{i-j}.$$

From this binary representation, the rules for constructing the corresponding distribution lists of nodes are straightforward. Once the nodes to be included in a distribution list are determined, constructing such distribution lists may be performed in accordance with techniques well known in the art. That is, it is within the skill of those in the art to construct such a distribution list, and therefore the technical details of the distribution lists construction is not elaborated on further herein so as not to detract from the inventive features described herein for distributing a file from an origin node to a plurality of recipient nodes.

This first example scaling technique for the above-described FastReplica algorithm is based on the reasoning described above. Consider the problem of replicating file F across nodes $N_1, \ldots, N_n$ and let $$\frac{n}{k} = m.$$

Then, all of the nodes may be partitioned into m groups: $G^1, G^2, \ldots, G^m$, where each group has k nodes. Any number m can be represented as $m = 2^{i_1} + 2^{i_2} + \ldots + 2^{i_j}$ (referred to herein as "Equation 1"), where $i_1 > i_2 > \ldots > i_j \geq 0$. Practically, this provides a binary representation of a number m. Then schematically, the above-described scalable FastReplica algorithm replicates file F to corresponding groups $G^1, G^2, \ldots G^m$ in $i_1+2$ steps as graphically shown in FIG. 8.

Figure 8:
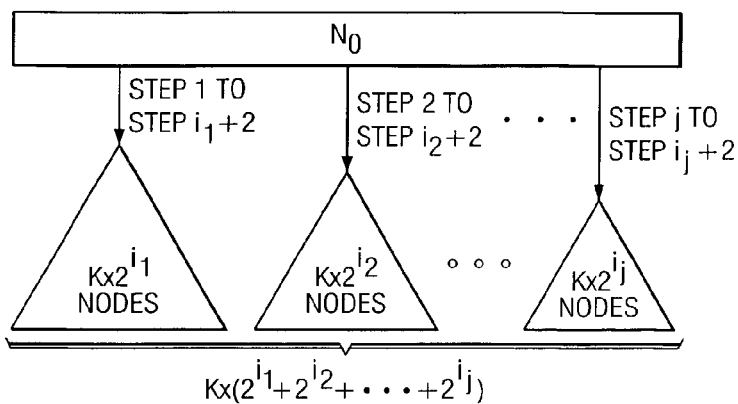
FIG. 8 shows a graphical representation of the number of recipient nodes to which a file F can be replicated in j logical steps in accordance with the first scalable file distribution process of FIG. 5.

If the targeted number n of nodes for a file replication is not a multiple of k, i.e., $$\frac{n}{k} = m + r,$$

where r<k, then there is one "incomplete" group G' with r nodes in it. A preferred way to deal with this group in this first scaling technique is to arrange it to be a leaf-group in the biggest sub-tree (i.e., the sub-tree having the longest path from node $N_0$), which replicates the original file to $2^{i_1}$ groups as shown in FIG. 8, e.g., group G' is assigned group number $2^{i_1}$. As an example, let k=10. How many algorithm steps are used in the example scalable FastReplica algorithm described above to replicate the original file F to 1000 nodes? Using Equation 1 above, the following representation for 1000 nodes is derived: $1000=10 \times (2^6+2^5+2^2)$. Thus, in 8 algorithm steps (each taking the $\frac{1}{k}$-th portion of the file to transfer), the original file F will be replicated among all 1000 nodes.

From the above, it should be recognized that this first scaling technique results in a relatively narrow scaling tree (such as the example scaling tree of FIG. 5). That is, the overall length of the sub-tree paths from node $N_0$ is relatively long as compared to the width of the tree (i.e., the number of groups at each level of the tree). Generally, a wider scaling tree is desired for greater efficiency. A second scaling technique that results in a wider scaling tree in many distribution environments than that of the first scaling technique, which may be used with file distribution techniques of embodiments of the present invention, such as the above-described FastReplica distribution technique, is described below in conjunction with FIGS. 9-11B.

Considering this second scaling technique, let k be a number of network connections chosen for concurrent transfers between a single node and multiple receiving nodes (i.e. k limits the number of nodes in the group for the above-described FastReplica strategy). A natural way to scale the above-described FastReplica in the Small algorithm to a large number of recipient nodes is:

(a) partition the original set of nodes into replication groups, each consisting of k nodes; and (b) apply FastReplica in the small iteratively: first, replicate the original file F to a first group of k nodes, and then use these k nodes of the first group as origin nodes with file F to repeat the same distribution procedure to further groups of nodes.

Figure 9:
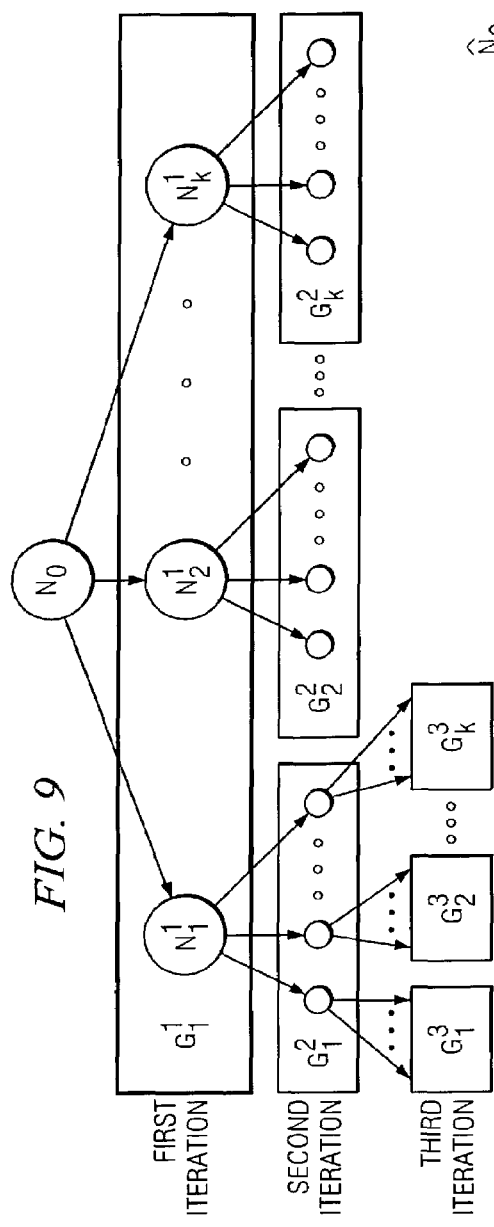
FIG. 9 shows a second example scaling technique for a file distribution process of an embodiment of the present invention.

Schematically, this procedure is shown in FIG. 9, where circles represent nodes, and boxes represent replication groups. The arrows, connecting one node with a set of other nodes, reflect the origin node and the recipient nodes involved in communications on a particular iteration of this second distribution algorithm.

At the first iteration shown in the example of FIG. 9, origin node $N_0$ replicates file F to a first group $G_1^1$ having k nodes (i.e., nodes $N_1^1, N_2^1, \ldots, N_k^1$ using the above-described FastReplica in the Small algorithm. That is, in the first iteration, origin node $N_0$ distributes a plurality of subfiles comprising file F to nodes $N_1^1, N_2^1, \ldots, N_k^1$ of first group $G_1^1$, and then such recipient nodes $N_1^1, N_2^1, \ldots, N_k^1$ exchange their respective subfiles such that all of the recipient nodes of the first group $G_1^1$ obtain the full file F. Such first group $G_1^1$ may be referred to herein as a first-level group of nodes.

At the second iteration, each node $N_i^1 (1 \leq i \leq k)$ of group $G^{11}$ can serve as an origin node propagating file F to the nodes of other groups $G_1^2, G_2^2, \ldots, G_k^2$. Such groups $G_1^2, G_2^2, \ldots G_k^2$ may be referred to herein as second-level groups of nodes. For instance, node $N_1^1$ of first-level group $G_1^1$ partitions file F into a plurality of subfiles and communicates such subfiles to the recipient nodes of second-level group $G_1^2$ in a manner similar to that described above in FIG. 1 for origin node $N_0$ communicating subfiles to nodes $N_1$-$N_n$. In other words, node $N_1^1$ of first-level group $G_1^1$ performs a distribution step to distribute a plurality of subfiles comprising file F to the recipient nodes of second-level group $G_1^2$. Preferably, node $N_1^1$ of first-level group $G_1^1$ establishes k concurrent communication connections with the k nodes of second-level group $G_1^2$ and communicates the subfiles comprising file F to the nodes of second-level group $G_1^2$ concurrently. Thereafter, the nodes of second-level group $G_1^2$ exchange their respective received subfiles. In other words, the nodes of second-level group $G_1^2$ perform a collection step, such as that described above for the FastReplica algorithm.

Similarly, each other node $N_2^1, \ldots, N_k^1$ of first-level group $G_1^1$ may concurrently (in iteration 2) distribute file F to second level groups $G_2^2, \ldots, G_k^2$, respectively, in a similar manner to that described above for distribution from node $N_1^1$ to group $G^2$ (e.g., using the above-described FastReplica distribution technique). This distribution technique may be referred to herein as an iterative "one-to-many" distribution technique, as each node of each group at each level may act as an origin node to distribute file F to many nodes comprising a group at a next level.

In view of the above, in two iterations, file F can be replicated to k×k nodes using this iterative one-to-many distribution technique. Correspondingly, in three iterations, file F can be replicated to k×k×k nodes, and so on. As an example of grouping the recipient nodes, suppose it is desired to replicate file F across nodes $N_1, \ldots, N_n$ and let $$\frac{n}{k} = m.$$

Then all of the nodes may be partitioned into m groups: $G^1, G^2, \ldots, G^m$, where each group has k nodes. Any number m can be represented in this second scaling technique as: $m = c_1 \times k^{i_1} + c_2 \times k^{i_2} + \ldots + c_j \times k^{i_j}$ (referred to herein as "Equation 2"), where $i_1 > i_2 > \ldots > i_j \geq 0$ and $0 < c_1, \ldots, c_j < k$, and wherein "c" is an integer coefficient. Practically, this provides a k-ary representation of a number m. This representation defines the rules for constructing the tree structure similar to the one shown in FIG. 9. In particular, the height of such a tree is $i_1 + 1$, and it defines the number of iterations using the second scaled distribution technique described above.

From this k-ary representation, the rules for constructing the corresponding distribution lists of nodes are straightforward. Once the nodes to be included in a distribution list are determined, constructing such distribution lists may be performed in accordance with techniques well known in the art. That is, it is within the skill of those in the art to construct such a distribution list, and therefore the technical details of the distribution lists construction is not elaborated on further herein so as not to detract from the inventive features described herein for distributing a file from an origin node to a plurality of recipient nodes.

If the targeted number n of nodes for a file replication is not a multiple of k, i.e., $$\frac{n}{k} = m + r,$$

where r<k, then there is one "incomplete" group $\hat{G}$ with r nodes in it. A preferred way to deal with this group when using this second scaling algorithm is to arrange it to be a leaf-group in the shortest subtree. So, assuming for instance that such an incomplete group exists in the example of FIG. 9, it would be arranged in the third level of the distribution tree such that group $G_2^2$ of the second level would act as complete group G' of FIG. 10 for communicating the subfiles to the nodes of the incomplete group.

Figure 10:
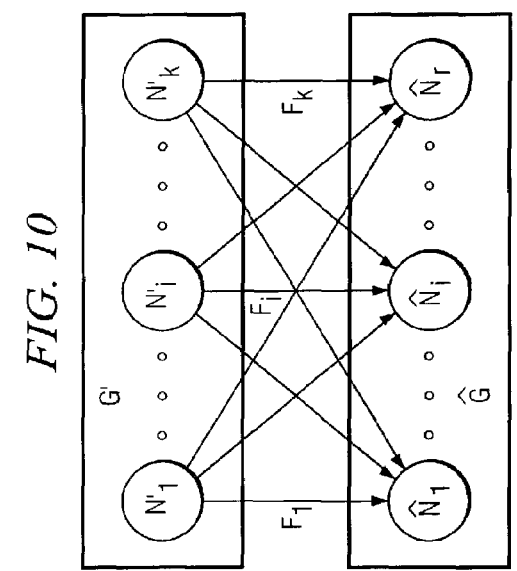
FIG. 10 shows communication paths between a complete group of nodes and an incomplete group of nodes in the example second scaled distribution process of FIG. 9.

For example, let $G' = \{N_1', \ldots, N_k'\}$ be a complete replication group in the shortest subtree. Further, let incomplete group $\hat{G}=\{\hat{N}_1, \ldots, \hat{N}_r\}$ where r<k. The communications between groups G' and $\hat{G}$ may follow a slightly different file exchange protocol than that described above in FIG. 9 for communicating file F from a node of one group to the nodes of another complete group in certain implementations of this second scaling technique. Suppose that all of the nodes in G' have already received all subfiles $F_1, \ldots, F_n$ comprising the entire original file F (e.g., when performing iteration 2 in FIG. 9, all of the nodes of group $G_1^{\ 1}$ have received all of subfiles $F_1, \ldots, F_n$ comprising the entire original file F, as such subfiles were received in the first iteration). Each node $N_1'$ of group G' opens r concurrent network connections to all r nodes of group G' for transferring its respective subfile $F_i$, as shown in FIG. 10. In this way, at the end of this step, each node of group $\hat{G}$ has all subfiles $F_1, \ldots, F_k$ of original file F. This step may be referred to herein as a special step. It should be recognized that this special step corresponds to the "group-to-group" type of distribution utilized in the first scaling technique described above. Thus, in certain implementations, if a group of recipient nodes is not complete (i.e., does not have k nodes), then the group-to-group distribution technique of the first example scaled distribution may be utilized for communicating the file F to such incomplete group. Accordingly, in certain embodiments, a hybrid of the first example scaling technique described above and the second example scaling technique described above may be utilized. More particularly, both the above-described group-to-group distribution technique and the above-described one-to-many distribution technique may be employed in certain implementations of the scaled distribution algorithm. For instance, the one-to-many distribution technique may be used for all complete groups having k nodes, and the group-to-group distribution technique may be used for any incomplete group that has less than k nodes.

As an example, let k=10 (i.e., 10 concurrent communication connections are determined to be suitable for use between the nodes). How many algorithm iterations are required to replicate the original file F to 1000 nodes using the second scaled distribution technique described above? Using Equation 2 above, the following representation for 1000 nodes can be derived: $1000=10\times10^2$. Thus, in three algorithm iterations (10×10×10), the original file F can be replicated among all 1000 nodes. At each iteration, the replication process follows the above-described FastReplica in the Small distribution technique, i.e., each iteration has 2 steps (a distribution step and a collection step), each used for transferring the $$\frac{1}{k}\text{-}th$$

portion of original file F.

Scaling techniques such as the first and second scaling techniques described above are further described in U.S. Published Patent Application No. titled "SYSTEM AND METHOD FOR EFFICIENTLY REPLICATING A FILE", the disclosure of which is hereby incorporated herein by reference. As described further in Published U.S. Patent Application No. 2004/0 143576, titled "SYSTEM AND METHOD FOR EFFICIENTLY REPLICATING A FILE AMONG A PLURALITY OF RECIPIENTS HAVING IMPROVED SCALABILITY", depending on the value of k and the targeted number of nodes in the overall replication set, service providers may choose between the first scaling technique of FastReplica and the second scaling technique of FastReplica described above favoring the algorithm with better performance for a particular range of values. Further, a hybrid of such scaling techniques may be implemented in certain embodiments. For example, a group-to-group scaling technique may be used for distribution to certain group(s) (e.g., incomplete groups) and a one-to-many scaling technique may be used for distribution to certain other group(s) of recipient nodes.

As one example application of embodiments of the present invention, consider the distribution of streaming media files within a CDN. In order to improve streaming media quality, the latest work in this direction proposes to stream video from multiple edge servers (or mirror sites), and in particular, by combining the benefits of multiple description coding (MDC) with Internet path diversity. MDC codes a media stream into multiple complementary descriptions. These descriptions have the property that if either description is received it can be used to decode the baseline quality video, and multiple descriptions can be used to decode improved quality video.

Thus, for a media file encoded with MDC, different descriptions can be treated as subfiles, and a distribution technique, such as the above-described FastReplica technique, can be applied to replicate them. That is, while the above examples describe partitioning a file into subfiles based, for example, on the number k of concurrent communication connections that can be supported by a node, in certain embodiments the distribution technique may be utilized with a file F encoded with multiple descriptions, wherein each of the multiple descriptions may be distributed to recipient nodes in the manner in which the above-described subfiles of a file F are described as being distributed.

Taking into account the nature of MDC (i.e., that either description received by the recipient node can be used to decode the baseline quality video), the reliability of the scaled FastReplica algorithm may be improved. For instance, when using the first scaling technique described above for distributing a media file encoded with MDC, even if failed nodes exist in the distribution tree, this first scaled FastReplica technique may provide a suitable distribution technique because receipt by nodes below the failed node(s) in the distribution tree of a portion of the descriptions (from the working nodes of the higher level) will be enough to decode the good quality video. That is, when using a group-to-group distribution technique, if one of the nodes in a first group responsible for distributing a particular subfile to the nodes of a second group fails, then the nodes of the second group will not receive this particular subfile. However, the nodes of the second group will still receive the subfiles from the working nodes of the first group, and with MDC encoding, such portion of the total number of subfiles may be sufficient to enable the nodes of the second group to decode the media file. Thus, service providers also may determine which of the above-described scaling techniques of FastReplica to utilize based on the content reliability requirements.

Embodiments of the present invention improve the robustness (or "reliability") of the above-described file distribution process (e.g., the scaled FastReplica algorithm) to deal with node failures. As can be seen from the above description of FastReplica, for example, such FastReplica algorithm is sensitive to node failures. For example, if node $N_1$ fails during the collection step shown in FIGS. 2 and 3, this event may impact all other nodes $N_2, \ldots, N_n$ in this distribution group because each node depends on node $N_1$ to receive subfile $F_1$. Thus, node $N_1$ may fail when it is acting as a recipient node in the replication set. Additionally, as described with the second scaling technique above (of FIG. 9), node $N_1$ may also act as an origin node for distributing file F to further groups. If a node fails when it is acting as an origin node (e.g., node $N_0^1$ in FIG. 11 described below), this failure impacts all of the replication groups in the replication subtree rooted in the failed node.

As described further below, an embodiment of the present invention provides a reliable distribution technique (such as the above-described FastReplica distribution technique) that efficiently deals with node failures by making a local "repair decision" (which may be referred to herein as a local "distribution detour decision") within the particular group of nodes. As described below, an embodiment of the present invention, keeps the main structure of the FastReplica algorithm described above practically unchanged, while adding the desired property of resilience to node failures.

In accordance with an embodiment of the present invention, the nodes of each group exchange heartbeat messages with their origin node. The heartbeat messages from nodes to their origin node may be augmented with additional information on the corresponding algorithm step and group (list) of nodes to which they are currently responsible for performing distribution.

Figure 11:
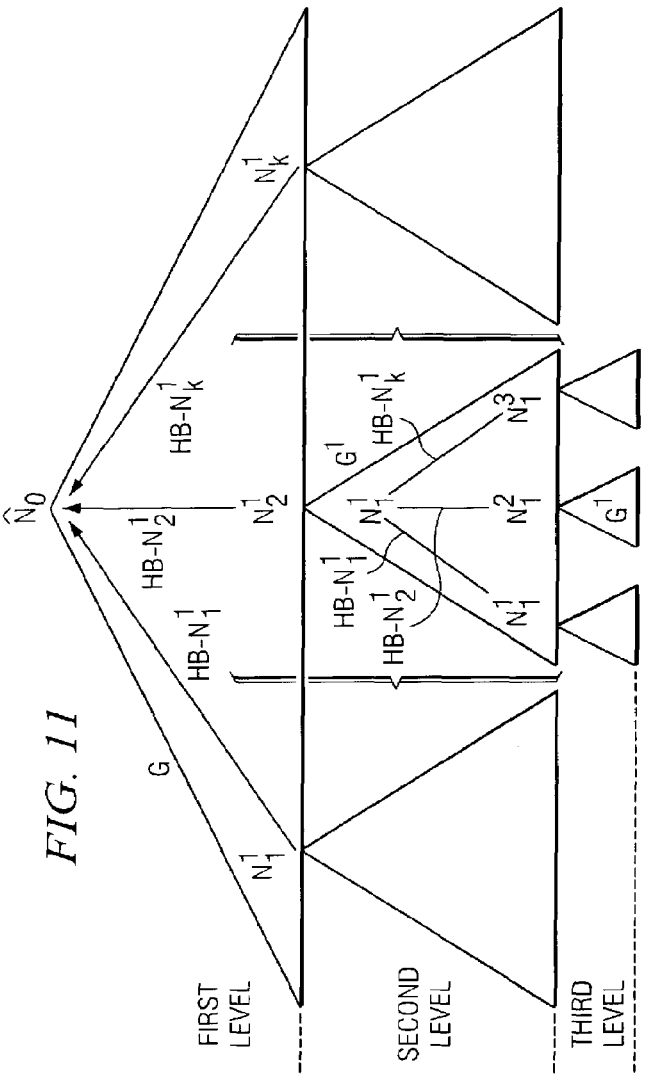
FIG. 11 shows an example distribution tree having three levels that is formed in accordance with the second scaled distribution technique of FIG. 9.

For instance, turning to FIG. 11, an example distribution tree having three levels that is formed in accordance with the second scaled FastReplica distribution technique described above is shown. In FIG. 11, the first level of the tree comprises group G of recipient nodes, which includes nodes $N_1^1$, $N_2^1, \ldots, N_k^1$. The second level of the tree comprises further groups to which file F is distributed by the nodes of group G. For instance, the second level comprises group G' having nodes $N_1', \ldots, N_k'$ to which node $N_1^2$ of group G acts an origin node (for distributing file F thereto). The third level of the tree comprises further groups to which file F is distributed by the nodes of group G'. For instance, the third level comprises group G'' of nodes to which node $N_2'$ of group G' acts an origin node (for distributing file F thereto).

In accordance with one embodiment of the present invention, the nodes of group G form a heartbeat group with their origin node $\hat{N}_0$. Thus, for example, node $N_1^1$ of group G communicates heartbeat messages HB-$N_1^1$ with origin node $\hat{N}_0$ during the file distribution process, node $N_2^1$ of group G communicates heartbeat messages HB-$N_2^1$ with origin node $\hat{N}_0$ during the file distribution process, and node $N_k^1$ of group G communicates heartbeat messages HB-$N_k^1$ with origin node $\hat{N}_0$ during the file distribution process. Similarly, nodes $N_1', \ldots, N_k'$ of group G' form a heartbeat group with their origin node $N_2^1$. Each node $N'_1$ sends to their respective origin node $N_2^1$ the heartbeat messages with additional information on node state in the replication process. For instance, nodes $N_1'$, $N_2'$, and $N_k'$, send heartbeat messages HB-$N_1'$, HB-$N_2'$, and HB-$N_k'$, respectively, to their origin node $N_2^1$. Table 1 shows an example heartbeat message that may be communicated by node $N_2^1$ of FIG. 11 to its respective origin node $\hat{N}_0$.

TABLE 1

| Node Identification | Node Status | Current Distribution Step | Current Distribution List |
|---|---|---|---|
| $N_2^1$ | I'm Alive | Distribution | Nodes $\{N'_1, \ldots, N'_k\}$ |

It should be recognized that the exchange of heartbeat messages by a "group" of nodes may be performed only during the distribution process in certain embodiments. For instance, recipient nodes may be logically "grouped" only for a distribution of a file F, and different distributions (of other files at other times) may comprise different logical groupings of the recipient nodes. Thus, the recipient nodes may exchange heartbeat messages with the other nodes of their group only during a distribution process, and once the distribution is complete, the nodes may no longer be "grouped" or exchange heartbeat messages.

In accordance with an embodiment of the present invention, different "repair" procedures (for repairing the file distribution) may be utilized in response to a failed node depending on whether the failed node was acting as a recipient node or acting as an origin node (e.g., $N_2^1$ for replication set G'). As an example of one embodiment, consider the nodes comprising group $G_1^1$ in the distribution example discussed above in conjunction with FIG. 9. The nodes of group $G_1^1$ are involved in different group communications at different steps of this second example scaled FastReplica algorithm. For instance, in the distribution step of the first iteration, the nodes of group $G_1^1$ are involved in communication with origin node $N_0$, in which node $N_0$ communicates the subfiles comprising file F to the nodes of group $G_1^1$. Further, in the collection step of the first iteration, the recipient nodes of group $G_1^1$ are involved in communication with each other to exchange their respective subfiles. Further still, in this second example scaled distribution technique of FIG. 9, the nodes of group $G_1^1$ each act as origin nodes for distribution of file F to further groups $G_1^G, \ldots, G_k^2$ in the second iteration.

Thus, in the example scaled distribution technique described with FIG. 9, there are three basic communication patterns in which a node of group $G_1^1$ might be involved at a moment of its failure:

1. Node $N_i^1$ of group $G_1^1$ may fail when it is acting as a recipient node during a distribution step (e.g., during the distribution of the first iteration of FIG. 9 in which origin node $N_0$ distributes subfiles comprising file F to the nodes of group $G_1^1$). That is, node $N_i^1$ of group $G_1^1$ may fail while (or before) its origin node $N_0$ is communicating subfile $F_i$ to node $N_i^1$. At this point of failure, none of the nodes in group $G_1^1$ has received the subfile $F_i$ yet. Since node $N_i^1$ is failed during (or before) the communication of subfile $F_i$ from $N_0$ to node $N_i^1$, node $N_0$ is aware of node $N_i^1$'s failure. For instance, node $N_0$ may receive an error message (e.g., it will get no "ACK" for sent packets and eventually a TCP timeout may be encountered) when attempting to communicate the subfile to node $N^{i1}$ indicating to node $N_0$ that the communication of subfile $F_i$ to node $N_i^1$ was unsuccessful.

2. Node $N_i^1$ of group $G_1^1$ may fail when it is acting as a recipient node during a collection step (e.g., during the collection of the first iteration of FIG. 9 in which the recipient nodes of group $G_1^1$ exchange their respective subfiles). That is, node $N_i^1$ of group $G_1^1$ may fail after such node $N_i^1$ has received subfile $F_i$ and before (or during) its transfer of such subfile $F_i$ to the remaining nodes in group $G_1^1$. In a worst case scenario, none of the nodes in group $G_1^1$ has received subfile $F_i$ at the time of node $N_i^1$'s failure.

3. Node $N_i^1$ of group $G_1^1$ may fail when it is acting as an origin node. That is, node $N_i^1$ may fail when it is communicating the subfiles comprising file F to the nodes of a further group (e.g., in the second iteration of FIG. 9).

According to an embodiment of the present invention, a different "repair procedure" may be utilized depending on whether the failed node is currently acting as a recipient node during a distribution step, acting as a recipient node during a collection step, or acting as an origin node in the second example scaled FastReplica algorithm described above with FIG. 9.

Figure 12:
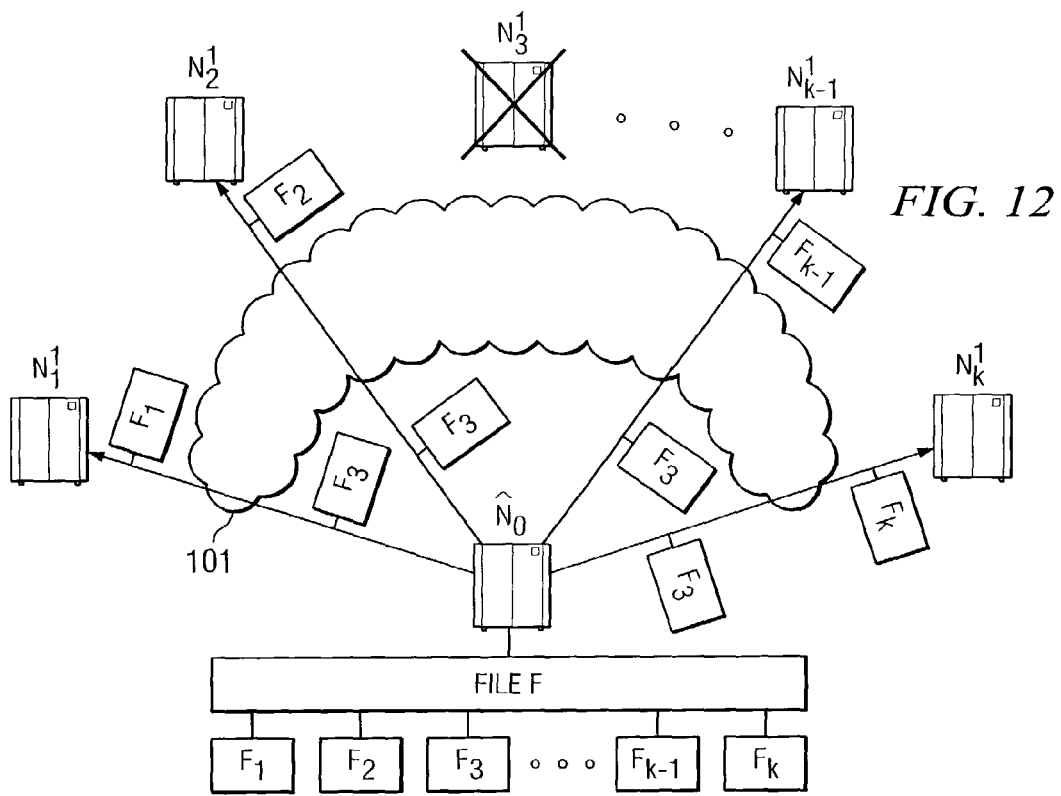
FIG. 12 shows an example in which a node fails while acting as a recipient node during a distribution step of the scaled distribution process of FIG. 9.

First, consider when a node failure occurs when a node is acting as a recipient node during the distribution step of the above-described FastReplica algorithm. An example of such a node failure during the distribution step and an example technique for "repairing" the distribution of file F to the nodes of the distribution group is shown in FIG. 12. More specifically, FIG. 12 shows an example in which origin node $\hat{N}_0$ is distributing subfiles $\{F_1, \ldots, F_k\}$ to recipient nodes $\{N_1^1, \ldots, N_k^1\}$ of group G, as in the distribution step of the first iteration (or first level) of FIG. 11. In the example of FIG. 12, node $N_3^1$ has failed when it is acting as a recipient node during this distribution step. Accordingly, origin node $\hat{N}_0$ is unable to communicate subfile $F_3$ to node $N_3^1$. In this case, node $\hat{N}_0$ is aware of node $N_3^1$'s failure because it received an error message when attempting to communicate the subfile $F_3$ to node $N_3^1$ indicating to node $\hat{N}_0$ that the communication of subfile $F_3$ to node $N_3^1$ was unsuccessful. Thus, in an embodiment of the present invention, origin node $\hat{N}_0$ performs the following "repair" step (or "distribution detour"): it uses the k-1 already-opened communication connections to the rest of the nodes in group G (i.e., the non-failed nodes $\{N_1^1, N_2^1,$ and $N_4^1, \ldots, N_k^1\}$) to send the missing $F_3$ subfile to each such non-failed node in group G, as shown in FIG. 12.

The process of enabling reliable distribution to non-failed nodes even when a failed node exists in a distribution group may be referred to as a "repair" of the distribution. Although, the failed node itself is not repaired by this process (but may instead remain in a failed state). Thus, the use of "repair" herein should not be confused with repairing an actual failed node, but is instead used as repairing a distribution process that is dependent on a failed node. This process may instead be referred to herein as a "detoured" distribution process. For instance, in the above example the subfile $F_3$ is distributed to the non-failed nodes via a detour around the failed node $N_3^1$.

Thus, after the above-described detoured distribution step of FIG. 12, each of the non-failed nodes in group G has all of the subfiles of original file F. Additionally, origin node $\hat{N}_0$ acts as a "substitute" for the failed node $N_3$ at the next algorithm iteration. That is, if failed node $N_3^1$ was supposed to serve as the origin node to a further group of recipient nodes in the next algorithm iteration (in accordance with the second scaled FastReplica process described above with FIG. 9), then node $\hat{N}_0$ acts as the origin node to such further group in place of the failed node $N_3^1$ for this iteration.

Figure 13A:
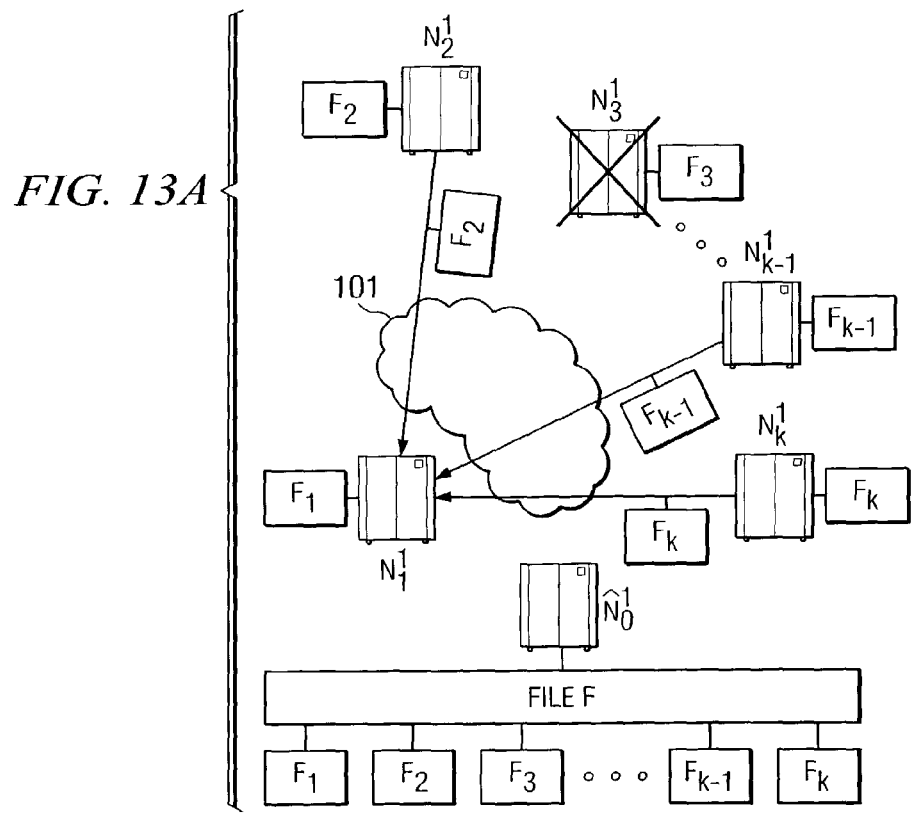
FIGS. 13A-13C show an example in which a node fails while acting as a recipient node during a collection step of the scaled distribution process of FIG. 9.
Figure 13B:
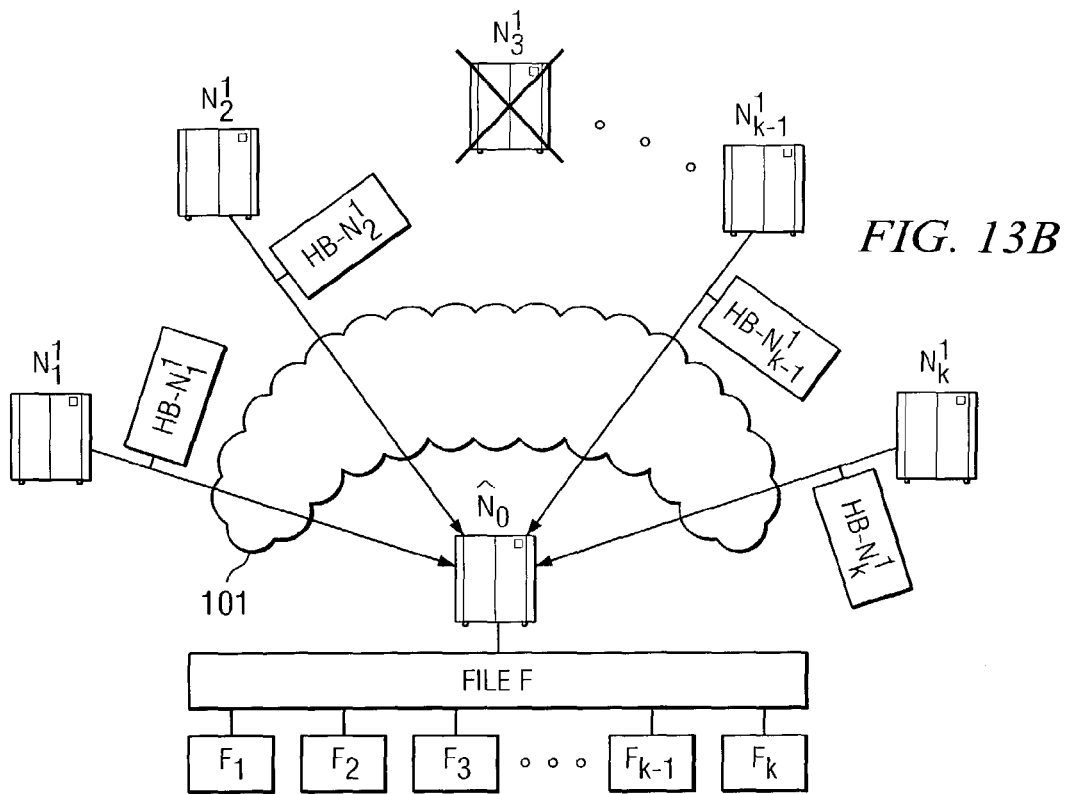
Figure 13C:
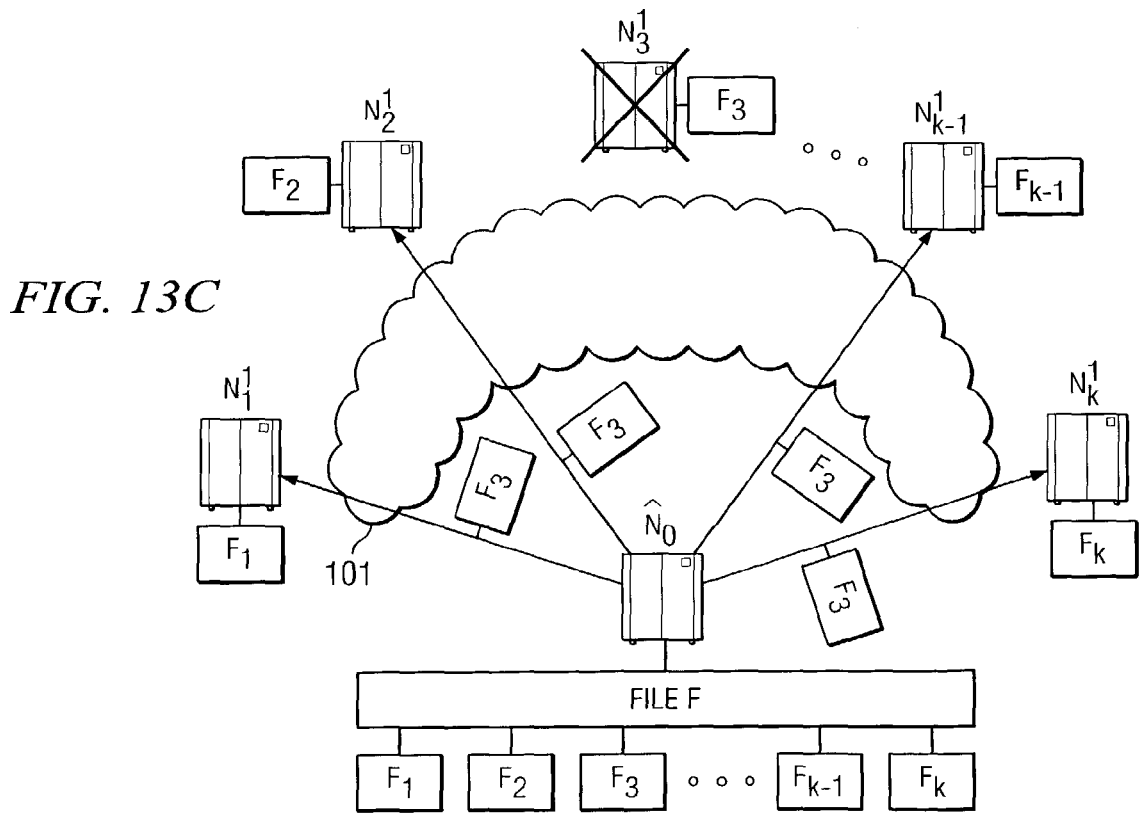

Consider instead now that a node failure occurs when a node is acting as a recipient node during the collection step of the FastReplica distribution process. An example of such a node failure during the collection step and an example technique for "repairing" the distribution of file F to the nodes of the distribution group is shown in FIGS. 13A-13C. More specifically, FIG. 13A shows an example in which the nodes of group G are performing the collection step. For instance, as shown in the example of FIG. 13A, all of the non-failed nodes are communicating their respective subfiles to node $N_1^1$ (such as in the example collection process described above with FIG. 2) Of course, while not shown in FIG. 13A for conciseness, each of the non-failed nodes may have concurrent communication connections with each of the other non-failed nodes to concurrently exchange their respective subfiles. In the example of FIG. 13A, node $N_3^1$ has failed while acting as a recipient node during this collection step. In this case, node $N_3^1$ failed after the distribution of subfile $F_3$ to such node $N_3^1$ from origin node $\hat{N}_0$. Thus, as shown, node $N_3^1$ has subfile $F_3$, but is unable to communicate such subfile $F_3$ to the other recipient nodes of group G. In this case, origin node $\hat{N}_0$ is unaware of node $N_3^1$'s failure because the communication of subfile $F_3$ to node $N_3^1$ has completed before node $N_3^1$ fails.

According to one embodiment of the present invention, heartbeat messages are used between the nodes of a distribution (e.g., group G in the above example) and their origin node to detect when one of the nodes fails. For instance, using the heartbeat messages of one embodiment, such as heartbeat messages HB-$N_1^1$, HB-$N_2^1$, and HB-$N_k^1$ from nodes $N_1^1$, $N_2^1$, and $N_k^1$, respectively to origin node $\hat{N}_0$ shown in FIG. 11. Thus, for example, each node of group G may periodically send a heartbeat message to their origin node $\hat{N}_0$. As further shown in the example of FIG. 13B, nodes $\{N_1^1, N_2^1,$ and $N_4^1, \ldots, N_k^1\}$ send heartbeat messages $\{$HB-$N_1^1$,HB-$N_2^1$, and HB-$N_4^1, \ldots,$ HB-$N_k^1\}$, respectively, to their origin node $\hat{N}_0$. Upon origin node $\hat{N}_0$ recognizing that a heartbeat message is not received from node $N_3$, node $N_0$ detects that node $N_3^1$ has failed. Accordingly, in one embodiment of the present invention, origin node $\hat{N}_0$ performs the following repair (or "distribution detour") step: it opens communication connections to the impacted nodes in group G (i.e., the remaining non-failed nodes that have yet to receive subfile $F_3$) to send the missing subtile $F_3$ to such nodes, as shown in FIG. 13C.

Thus, after the above-described detoured distribution step of FIG. 13C, each of the non-failed nodes in group G has all of the subfiles of original file F. Additionally, origin node $\hat{N}_0$ acts as a "substitute" for the failed node $N_3^1$ at the next algorithm iteration. That is, if failed node $N_3^1$ was supposed to serve as the origin node to a further group of recipient nodes in the next algorithm iteration (in accordance with the second scaled FastReplica process described above with FIG. 9), then node $\hat{N}_0$ acts as the origin node to such further group in place of the failed node $N_3^1$ for this iteration.

Consider instead now that a node failure occurs when the node is acting as an origin node. For example, suppose node $N_2^1$ of FIG. 11 fails while acting as the origin node for replication group G' during the distribution of the subfiles to the nodes of such group G'. In this case, replication group G' is "reattached" to a higher-level origin node in accordance with an embodiment of the present invention. For instance, in FIG. 11 node $\hat{N}_0$ is the corresponding origin node for node $N_2^1$ from the previous iteration step (e.g., the first level iteration). From heartbeat messages, node $\hat{N}_0$ detects node $N_2^1$'s failure. Node $\hat{N}_0$ analyzes the operational state of node $N_2^1$ in the replication process preceding its failure. Then, node $N_0$ acts as a replacement for failed node $N_2^1$: it opens connections to the impacted nodes in group G' to send corresponding missing files. Additionally, $\hat{N}_0$ updates every node in G' about the change of the origin node (for future exchange of heartbeat messages). In this manner, the origin node of the failed node $N_2^1$ acts as a substitute origin node for the failed node $N_2$.

Figure 14A:
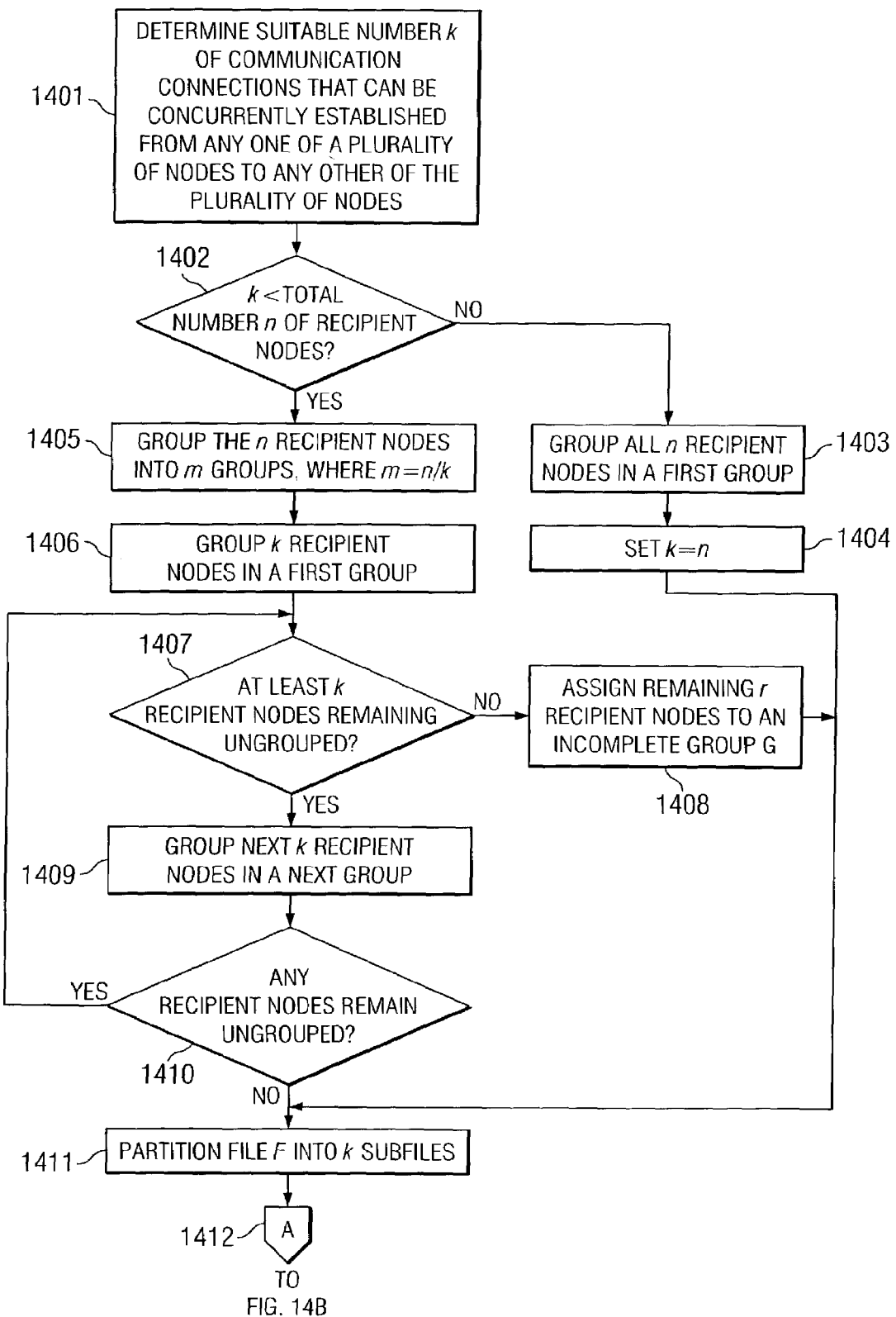

Turning now to FIGS. 14A-14B, an example operational flow diagram is shown for a reliable, scaled FastReplica distribution process in accordance with an embodiment of the present invention. As shown in FIG. 14A, operation of this example embodiment starts with operational block 1401, whereat a suitable number k of communication connections that can be concurrently established from any one of a plurality of nodes $N_1, N_2, \ldots, N_n$ to which a file F is to be distributed to any other of the plurality of nodes is determined. In operational block 1402 it is determined whether k is less than the total number n of recipient nodes to which file F is to be distributed. If k is not less than the total number n of recipient nodes, then operation advances to block 1403 whereat all n of the recipient nodes are grouped into a first group of nodes. Then, in operational block 1404, k is set equal to n. That is, the number of concurrent communication connections that is established from any one of the nodes during distribution is set to n. Operation then advances from block 1404 to operational block 1411, which is described further below.

If, at operational block 1402, it is determined that k is less than the total number n of recipient nodes, then operation advances to block 1405 whereat the n recipient nodes are logically grouped into m groups, wherein $$m = \frac{n}{k}$$

as discussed above. Then, in operational block 1406 the first k number of recipient nodes (i.e., nodes $N_1, N_2, \ldots, N_k$) are logically grouped into a first group of nodes (i.e., are grouped into a first one of the m groups). Then, in operational block 1407 it is determined whether at least k recipient nodes remain ungrouped. If there are fewer than k recipient nodes remaining to be grouped, then operation advances to block 1408 whereat the remaining r recipient nodes (r<k) are grouped to an incomplete group $\hat{G}$. Operation then advances from block 1408 to operational block 1411, which is described further below.

If, at operational block 1407, it is determined that at least k recipient nodes remain ungrouped, operation advances to block 1409 whereat the next k number of recipient nodes are logically grouped into a next group. Then, in operational block 1410, it is determined whether any recipient nodes remain ungrouped. If more recipient nodes do remain ungrouped, then operation returns to block 1407 to continue the logical grouping of the recipient nodes. If it is determined at operational block 1410 that no further recipient nodes remain ungrouped, then operation advances to block 1411 whereat file F is partitioned into k subfiles. Operation then advances to FIG. 14B via linking block A 1412.

Turning to FIG. 14B, as shown in operational block 1413, for a first level of a distribution tree (such as the distribution tree of FIG. 11), origin node $N_0$ of the first group of recipient nodes performs the distribution step of the FastReplica algorithm to communicate the subfiles comprising file F to the nodes of the first group. In operational block 1414, it is determined whether origin node $N_0$ detects a failed recipient node in the first group when performing the distribution step of the FastReplica algorithm. If origin node $N_0$ does detect a failed recipient node in the first group during the distribution step, then operation advances to block 1415 whereat the origin node $N_0$ uses its concurrent communication connections with each of the non-failed nodes of the first group and distributes the subfile $F_i$ of the detected failed node $N_i$ to the non-failed nodes of the first group. Operation then advances to block 1416, discussed below.

If it is determined at block 1414 that origin node $N_0$ does not detect a failed recipient node in the first group during the distribution step, then operation advances to block 1416 whereat the recipient nodes of the first group perform the collection step of FastReplica to exchange their respective subfiles. In block 1417, the nodes of the first group communicate heartbeat messages to their origin node $N_0$, and at block 1418 the origin node determines from such heartbeat messages whether there are any newly failed nodes in the first group. If a failed node is detected in block 1418, then origin node $N_0$ determines, in block 1419, the subfile $F_i$ that the failed node $N_i$ was to distribute to the other nodes of the first group. In block 1420, origin node $N_0$ establishes concurrent communication connections with each of the non-failed nodes of the first group, and distributes the determined subfile $F_i$ to the non-failed nodes of the first group. Operation then advances to block 1421, discussed below.

If it is determined at block 1418 that origin node $N_0$ does not detect a failed recipient node in the first group during the collection step, then operation advances to block 1421 whereat it is determined whether further groups remain to have the file F distributed thereto. If no such groups remain, the distribution process ends at block 1422. Otherwise, operation advances to block 1423 whereat for each complete group at the next level of the distribution tree, a node of each group of the current level acts as an origin node to perform FastReplica (block 1424).

In block 1425, the acting origin node(s) provide heartbeat messages to their respective origin node, and in block 1426 it is determined whether an acting origin node is failed. If such a failure is detected, then operation advances to block 1427 whereat the origin node of the failed acting origin node substitutes for performing FastReplica to the distribution group of the failed acting origin node. For instance, in FIG. 11, if acting origin node $N_2^1$ fails while acting as origin node for distribution group G', then node $N_2^1$'s origin node (i.e., node $\hat{N}_0$) substitutes as the origin node for such distribution group G'. Operation then returns to block 1421 to determine whether further groups are remaining, as shown.

As also shown in the example of FIG. 14B, operation may advance from block 1421 to operational block 1428 for each incomplete group at the next level of the distribution tree (e.g., concurrent with the above-described operations of blocks 1423-1427). In operational block 1429, a complete group of the current level performs group-to-group distribution to this incomplete group. The reliability of such group-to-group distribution may be improved to account for failed nodes in a manner such as described in U.S. Published Patent Application No. 2004/0143647 titled "SYSTEM AND METHOD FOR EFFICIENTLY REPLICATING A FILE AMONG A PLURALITY OF RECIPIENTS IN A RELIABLE MANNER", the disclosure of which is hereby incorporated herein by reference.

While FIGS. 14A-14B show one example reliable distribution process that enables reliable distribution of file F accounting for failed recipient nodes, various other reliable distribution techniques may be utilized in accordance with the distribution techniques described herein, and any such distribution techniques are intended to be within the scope of the present invention.

Various elements for performing the above-described file distribution functions of embodiments of the present invention may be implemented in software, hardware, firmware, or a combination thereof. For example, software may be used on an origin node $N_0$ for determining logical groupings of recipient nodes and/or for partitioning file F into the appropriate number of subfiles. As another example, network interfaces may be used to concurrently communicate subfiles from an origin node to recipient nodes of a distribution group (e.g., in the distribution step of FastReplica), as well as for communication of such subfiles between recipient nodes of the distribution group (e.g., in the collection step of FastReplica).

When implemented via computer-executable instructions, various elements of embodiments of the present invention for distributing file F from an origin node to recipient nodes are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

What is claimed is:

1. A method of distributing a file F from a first node to a plurality of recipient nodes, the method comprising:
    logically organizing a plurality of recipient nodes to which a file F is to be distributed into a plurality of groups of recipient nodes, wherein each group comprises a plurality of said recipient nodes;
    partitioning said file F into a plurality of subfiles;
    performing distribution of said file F to said plurality of groups of recipient nodes using a distribution technique that comprises
        (a) an origin node attempting to establish concurrent communication connections with recipient nodes of a first group and communicate the plurality of subfiles to the recipient nodes of the first group, wherein the origin node attempts to communicate at least one subfile to each recipient node of said first group but not all of said plurality of subfiles to any recipient node of said first group,
        (b) said plurality of recipient nodes of said first group attempting to exchange their respective subfiles received from said origin node, and
        (c) attempting to distribute the plurality of subfiles from at least one node of said first group to recipient nodes of a second group;
    detecting a failed node; and
    said distribution technique adapting to distribute said file F to each non-failed node of said plurality of recipient nodes to which said file F is to be distributed.

2. The method of claim 1 wherein said distribution technique adapting responsive to said detecting a failed node.

3. The method of claim 1 wherein said detecting a failed node comprises said origin node detecting a failed node in said first group such that said origin node is unable to communicate a particular subfile to such failed node.

4. The method of claim 2 wherein said distribution technique adapting comprises:
    responsive to said origin node detecting a failed node in said first group such that said origin node is unable to communicate a particular subfile to such failed node, said origin node using its established concurrent communication connections with non-failed nodes of said first group to communicate the particular subfile to said non-failed nodes.

5. The method of claim 1 wherein said origin node attempting to establish concurrent communication connections with each node of a first group and communicate the plurality of subfiles to the recipient nodes of the first group comprises:
    said origin node attempting to communicate a different one of said plurality of subfiles to each of said recipient nodes of said first group.

6. The method of claim 5 wherein said detecting a failed node comprises said origin node detecting a failed node in said first group such that said origin node is unable to communicate a particular subfile to such failed node, and wherein said distribution technique adapting comprises:
    responsive to said origin node detecting a failed node in said first group such that said origin node is unable to communicate a particular subfile to such failed node, said origin node using its established concurrent communication connections with non-failed nodes of said first group to communicate the particular subfile to said non-failed nodes.

7. The method of claim 5 wherein said detecting a failed node comprises said origin node detecting a failed node in said first group after said origin node has communicated a particular subfile to such failed node but before such failed node has communicated said particular subfile to every other recipient node of said first group, and wherein said distribution technique adapting comprises:
    responsive to said origin node detecting a failed node in said first group after said origin node has communicated a particular subfile to such failed node but before such failed node has communicated said particular subfile to every other recipient node of said first group, said origin node establishing concurrent communication connections with non-failed nodes of said first group that have not received the particular subfile from said failed node, and said origin node communicating the particular subfile to said non-failed nodes.

8. The method of claim 1 wherein said detecting a failed node comprises said origin node detecting a failed node in said first group after said origin node has communicated a particular subfile to such failed node but before such failed node has communicated said particular subfile to every other recipient node of said first group.

9. The method of claim 8 wherein said distribution technique adapting comprises:
    responsive to said origin node detecting a failed node in said first group after said origin node has communicated a particular subfile to such failed node but before such failed node has communicated said particular sub file to every other recipient node of said first group, said origin node establishing concurrent communication connections with non-failed nodes of said first group that have not received the particular subfile from said failed node, and said origin node communicating the particular subfile to said non-failed nodes.

10. The method of claim 8 wherein said detecting a failed node comprises:
    said recipient nodes of said first group communicating heartbeat messages to said origin node; and
    said origin node detecting a failed node from analysis of heartbeat messages received from said first group.

11. The method of claim 10 wherein said origin node detecting a failed node from analysis of heartbeat messages received from said first group comprises:
    said origin node identifying a recipient node of said first group from which a heartbeat message was not received by said origin node.

12. The method of claim 1 wherein said detecting a failed node comprises said origin node detecting said at least one node of said first group as failed when said at least one node is attempting to distribute the plurality of subfiles to recipient nodes of a second group.

13. The method of claim 12 wherein said distribution technique adapting comprises:
    responsive to said origin node detecting said at least one node of said first group as failed when said at least one node is attempting to distribute the plurality of subfiles to recipient nodes of a second group, said origin node establishing concurrent communication connections with recipient nodes of said second group, and said origin node communicating the plurality of subfiles to said nodes of said second group.

14. The method of claim 1 wherein said plurality of recipient nodes of said first group attempting to exchange their respective subfiles received from said origin node further comprises:

said plurality of recipient nodes of said first group attempting to exchange their respective subfiles received from said origin node such that each recipient node of said first group obtains all of said plurality of subfiles.

15. The method of claim 1 wherein said plurality of recipient nodes of said first group attempting to exchange their respective subfiles received from said origin node further comprises: each recipient node of said first group attempting to communicate the subfile that it received from said origin node to every other recipient node of the first group.

16. A system comprising:
means for logically organizing a plurality of recipient nodes to which a file F is to be distributed into a plurality of groups of recipient nodes, wherein each group comprises a plurality of said recipient nodes;
means for partitioning said file F into a plurality of subfiles;
means for performing distribution of said file F to said plurality of groups of recipient nodes using a distribution technique that comprises
(a) an origin node attempting to establish concurrent communication connections with recipient nodes of a first group and communicate the plurality of subfiles to the recipient nodes of the first group, wherein the origin node attempts to communicate at least one subfile to each recipient node of said first group but not all of said plurality of subfiles to any recipient node of said first group,
(b) said plurality of recipient nodes of said first group attempting to exchange their respective subfiles received from said origin node, and
(c) attempting to distribute the plurality of subfiles from at least one node of said first group to recipient nodes of a second group;
means for detecting a failed node; and
said distribution technique adapting, responsive to said detecting means detecting a failed node, to distribute said file F to each non-failed node of said plurality of recipient nodes to which said file F is to be distributed.

17. The system of claim 16 wherein said detecting means comprises:
means for said origin node detecting a failed node in said first group.

18. The system of claim 17 wherein said means for said origin node detecting a failed node in said first group comprises:
means for said origin node detecting that said origin node is unable to communicate a particular subfile to a node of said first group.

19. The system of claim 17 wherein said distribution technique adapting comprises:
responsive to said detecting means detecting a failed node in said first group such that said origin node is unable to communicate a particular subfile to such failed node, said origin node using its established concurrent communication connections with non-failed nodes of said first group to communicate the particular subfile to said non-failed nodes.

20. The system of claim 16 wherein said detecting means comprises means for said origin node detecting a failed node in said first group after said origin node has communicated a particular subfile to such failed node but before such failed node has communicated said particular subfile to every other recipient node of said first group.

21. The system of claim 20 wherein said distribution technique adapting comprises:
responsive to said detecting means detecting a failed node in said first group after said origin node has communicated a particular subfile to such failed node but before such failed node has communicated said particular subfile to every other recipient node of said first group, said origin node establishing concurrent communication connections with non-failed nodes of said first group that have not received the particular subfile from said failed node, and said origin node communicating the particular subfile to said non-failed nodes.

22. The system of claim 20 wherein said means for said origin node detecting a failed node in said first group after said origin node has communicated a particular subfile to such failed node but before such failed node has communicated said particular subfile to every other recipient node of said first group comprises:
each of said recipient nodes of said first group comprising means for communicating heartbeat messages to said origin node; and
said origin node comprising means for analyzing heartbeat messages received from said first group to detect a failed node in said first group.

23. The system of claim 16 wherein said detecting means comprises means for said origin node detecting said at least one node of said first group as failed when said at least one node is attempting to distribute the plurality of subfiles to recipient nodes of a second group.

24. The system of claim 23 wherein said distribution technique adapting comprises:
responsive to said detecting means detecting said at least one node of said first group as failed when said at least one node is attempting to distribute the plurality of subfiles to recipient nodes of a second group, said origin node establishing concurrent communication connections with recipient nodes of said second group, and said origin node communicating the plurality of subfiles to said nodes of said second group.

25. The system of claim 23 wherein said means for said origin node detecting said at least one node of said first group as failed when said at least one node is attempting to distribute the plurality of subfiles to recipient nodes of a second group comprises:
said at least one node of said first group comprising means for communicating Heartbeat messages to said origin node; and
said origin node comprising means for analyzing heartbeat messages received from said at least one node of said first group.

26. A system comprising:
an origin node that comprises a file F;
a plurality of recipient nodes to which said file F is to be distributed;
said origin node operable to logically organize said plurality of recipient nodes into a plurality of groups of recipient nodes, wherein each group comprises a plurality of said recipient nodes;
said origin node operable to partition said file F into a plurality of subfiles;
said origin node operable to attempt to establish concurrent communication connections with recipient nodes of a first group and communicate the plurality of subfiles to the recipient nodes of the first group, wherein the origin node attempts to communicate at least one subfile to each recipient node of said first group but not all of said plurality of subfiles to any recipient node of said first group;
said plurality of recipient nodes of said first group operable to attempt to exchange their respective subfiles received from said origin node;

at least one node of said first group operable to act as an origin node to attempt to distribute the plurality of subfiles to recipient nodes of a second group;

said origin node operable to detect a failed node in said first group; and said origin node operable to manage distribution of said file F upon detecting a failed node in said first group in a manner such that every non-failed node of said first group receives said file F.

27. The system of claim 26 wherein said origin node is operable to detect a failed node in said first group by detecting that said origin node is unable to communicate a particular subfile to such failed node of said first group.

28. The system of claim 26 further comprising:

said origin node operable, responsive to said origin node detecting a failed node in said first group such that said origin node is unable to communicate a particular subfile to such failed node, to use its established concurrent communication connections with non-failed nodes of said first group to communicate the particular subfile to said non-failed nodes.

29. The system of claim 26 wherein said origin node is operable to attempt to communicate a different one of said plurality of subfiles to each recipient node of the first group.

30. The system of claim 29 further comprising:

said origin node operable, responsive to said origin node detecting a failed node in said first group such that said origin node is unable to communicate a particular subfile to such failed node, to use its established concurrent communication connections with non-failed nodes of said first group to communicate the particular subfile to said non-failed nodes.

31. The system of claim 26 further comprising:

said origin node operable, responsive to said origin node detecting a failed node in said first group after said origin node has communicated a particular subfile to such failed node but before such failed node has communicated said particular subfile to every other recipient node of said first group, to establish concurrent communication connections with non-failed nodes of said first group that have not received the particular subfile from said failed node and communicate the particular subfile to said non-failed nodes.

32. The system of claim 31 wherein each of said recipient nodes of said first group is operable to communicate heartbeat messages to said origin node, and said origin node is operable to analyze heartbeat messages received from said first group to detect a failed node in said first group.

33. The system of claim 26 further comprising:

said origin node operable, responsive to said origin node detecting said at least one node of said first group as failed when said at least one node is attempting to distribute the plurality of subfiles to recipient nodes of a second group, to establish concurrent communication connections with recipient nodes of said second group and communicate the plurality of subfiles to said nodes of said second group.

34. A method of distributing a file F from a first node to a plurality of recipient nodes, the method comprising:

logically organizing a plurality of recipient nodes to which a file F is to be distributed into a plurality of groups of recipient nodes, wherein each group comprises a plurality of said recipient nodes;

partitioning said file F into a plurality of subfiles;

an origin node attempting to establish concurrent communication connections with recipient nodes of a first group and communicate the plurality of subfiles to the recipient nodes of the first group, wherein the origin node attempts to communicate at least one subfile to each recipient node of said first group but not all of said plurality of subfiles to any recipient node of said first group;

wherein if said origin node detects a failed node in said first group such that it is unable to communicate a particular subfile to such failed node, then said origin node using the established concurrent communication connections with non-failed nodes of said first group to communicate the particular subfile to said non-failed nodes;

said plurality of recipient nodes of said first group attempting to exchange their respective subfiles received from said origin node;

wherein if a node in said first group is detected as failed before communicating its respective subfile received from said origin node to all of the other nodes of said first group, then said origin node establishing concurrent communication connections with the non-failed nodes of said first group and communicating the respective subfile of the failed node to each of the non-failed nodes of the first group;

attempting to distribute the plurality of subfiles from at least one node of said first group to recipient nodes of a second group;

wherein if said origin node detects said at least one node as failed when attempting to distribute the plurality of subfiles to said recipient nodes of said second group, then said origin node establishing concurrent communication connections with the nodes of said second group and communicating the plurality of subfiles to each of the nodes of said second group.

* * * * *

UNITED STATES PATENT AND TRADEMARK OFFICE
CERTIFICATE OF CORRECTION

PATENT NO. : 7,454,424 B2
APPLICATION NO. : 10/345719
DATED : November 18, 2008
INVENTOR(S) : Ludmila Cherkasova It is certified that error appears in the above-identified patent and that said Letters Patent is hereby corrected as shown below:

In column 10, line 24, delete "N0" and insert -- $N_0$ --, therefor.

In column 10, line 37, after "transfer" insert -- of --.

In column 12, line 39, delete "$N^{i1}$" and insert -- $N_i^1$ --, therefor.

In column 12, line 53, delete "$N^{i5}$" and insert -- $N_1^5$ --, therefor.

In column 13, line 13, delete "$N_k^{l}$" and insert -- $N_k^1$ --, therefor.

In column 13, line 16, delete "$N_l^2$" and insert -- $N_1^2$ --, therefor.

In column 13, line 38, delete "$(1 \leq \leq k)$" and insert -- $(1 \leq i \leq k)$ --, therefor.

In column 13, line 50, delete "$N_i^2$" and insert -- $N_i^1$ --, therefor.

In column 13, line 64, delete "$N^{i1}$" and insert -- $N_i^1$ --, therefor.

In column 14, line 10, delete "$i \leq 2$" and insert -- $i \geq 2$ --, therefor.

In column 14, line 62, delete "$2_1^i$" and insert -- $2^i$ --, therefor.

In column 15, line 53, delete "$G^{i1}$" and insert -- $G_1^1$ --, therefor.

In column 16, line 9, delete "$G^2$" and insert -- $G_1^2$ --, therefor.

UNITED STATES PATENT AND TRADEMARK OFFICE
CERTIFICATE OF CORRECTION

PATENT NO. : 7,454,424 B2
APPLICATION NO. : 10/345719
DATED : November 18, 2008
INVENTOR(S) : Ludmila Cherkasova It is certified that error appears in the above-identified patent and that said Letters Patent is hereby corrected as shown below:

In column 17, line 11, delete "$N_1{}'$" and insert -- $N_i^1$ --, therefor.

In column 19, line 31, delete "$N_1{}^2$" and insert -- $N^1{}_2$ --, therefor.

In column 19, line 43, delete "$N_0$" and insert -- $\hat{N}_0$ --, therefor.

In column 20, line 26, delete "$G_1{}^G$" and insert -- $G_1{}^2$ --, therefor.

In column 20, line 38, delete "$N_1{}^1$" and insert -- $N_i^1$ --, therefor.

In column 20, line 44, delete "$N^{i1}$" and insert -- $N_i^1$ --, therefor.

In column 21, line 11, delete "$\hat{N}_0$" and insert -- $\hat{N}_0$ --, therefor.

In column 21, line 38, delete "$N_3$" and insert -- $N_3{}^1$ --, therefor.

In column 21, line 63, delete "$\hat{N}_0$" and insert -- $\hat{N}_0$ --, therefor.

In column 22, line 15, delete "$N_3$" and insert -- $N_3{}^1$ --, therefor.

In column 22, line 15, delete "$N_0$" and insert -- $\hat{N}_0$ --, therefor.

In column 22, line 21, delete "subtile" and insert -- subfile --, therefor.

UNITED STATES PATENT AND TRADEMARK OFFICE
CERTIFICATE OF CORRECTION

PATENT NO. : 7,454,424 B2
APPLICATION NO. : 10/345719
DATED : November 18, 2008
INVENTOR(S) : Ludmila Cherkasova It is certified that error appears in the above-identified patent and that said Letters Patent is hereby corrected as shown below:

In column 22, line 25, delete "$\tilde{\hat{N}}_0$" and insert -- $\hat{N}_0$ --, therefor.

In column 22, line 44, delete "$N_0$" and insert -- $\hat{\boldsymbol{N}}_0$ --, therefor.

In column 22, line 50, delete "$N_2$" and insert -- $N_2^1$ --, therefor.

In column 26, line 29, in Claim 9, delete "sub file" and insert -- subfile --, therefor.

In column 28, line 42, in Claim 25, delete "Heartbeat" and insert -- heartbeat --, therefor.

Signed and Sealed this

Fourteenth Day of April, 2009

JOHN DOLL
*Acting Director of the United States Patent and Trademark Office*